(12) United States Patent
Grann et al.

(10) Patent No.: US 6,563,976 B1
(45) Date of Patent: May 13, 2003

(54) COST-EFFECTIVE WAVELENGTH DIVISION MULTIPLEXER AND DEMULTIPLEXER

(75) Inventors: Eric B. Grann, San Ramon, CA (US); Yung-Chieh Hsieh, San Jose, CA (US)

(73) Assignee: Blaze Network Products, Inc., Pleasanton, CA (US)

( * ) Notice: Subject to any disclaimer, the term of this patent is extended or adjusted under 35 U.S.C. 154(b) by 0 days.

(21) Appl. No.: 09/568,220

(22) Filed: May 9, 2000

(51) Int. Cl.[7] .............................................. G02B 6/293

(52) U.S. Cl. .............................. 385/24; 385/33; 385/47; 359/127

(58) Field of Search .............................. 385/24, 37, 47, 385/31, 33; 359/124, 127, 130

(56) References Cited

U.S. PATENT DOCUMENTS

| | | | |
|---|---|---|---|
| 5,835,517 A | * 11/1998 | Jayaraman et al. ........... | 372/50 |
| 5,894,535 A | * 4/1999 | Lemoff et al. ................. | 385/47 |
| 6,198,864 B1 | * 3/2001 | Lemoff et al. ................. | 385/47 |
| 6,201,908 B1 | * 3/2001 | Grann ........................ | 385/24 |

* cited by examiner

*Primary Examiner*—Hemang Sanghavi
(74) *Attorney, Agent, or Firm*—Bruce H. Johnsonbaugh

(57) ABSTRACT

A cost-effective wavelength division multiplexer and demultiplexer for use in optical communication consists of three modules, including a fiber array, a lens array and a filter array/reflector. Each array is made in wafer level with very precise position control and is bonded to an adjacent wafer by conventional wafer bonding techniques. In addition to eliminating the need for active alignment in the manufacturing process of a wavelength division multiplexer (WDM) transceiver, the invention reduces the footprint of such a device to the order of a few millimeters and the process is suitable for low-cost, large quantity manufacturing. The fiber array is connected to the light sources, which optimally are fiber pig-tailed semiconductor lasers to enable repeatable and accurate placement in reference to the lens array. The input lenses are used to collimate the beams such that light traveling from them at an angle will zigzag between the reflector and the bandpass filters of the filter array/reflector combination. In the multiplexer configuration, an output lens is used to focus and couple the beams from each different laser into a fiber.

20 Claims, 18 Drawing Sheets

V-groove and the one-dimensional fiber array sandwitched by two-set of V-groove

λ = 1280nm, work perfectly

λ = 1280nm, Defocused in receiving side, for long distance propagation.

λ = 1280nm Move the light source away from the focal point, the image and objects are on the symmetric positions, but both of them are not in the focal point of the lenses.

λ = 1340nm, work perfectly, for the focal point is shifted toward the lens.

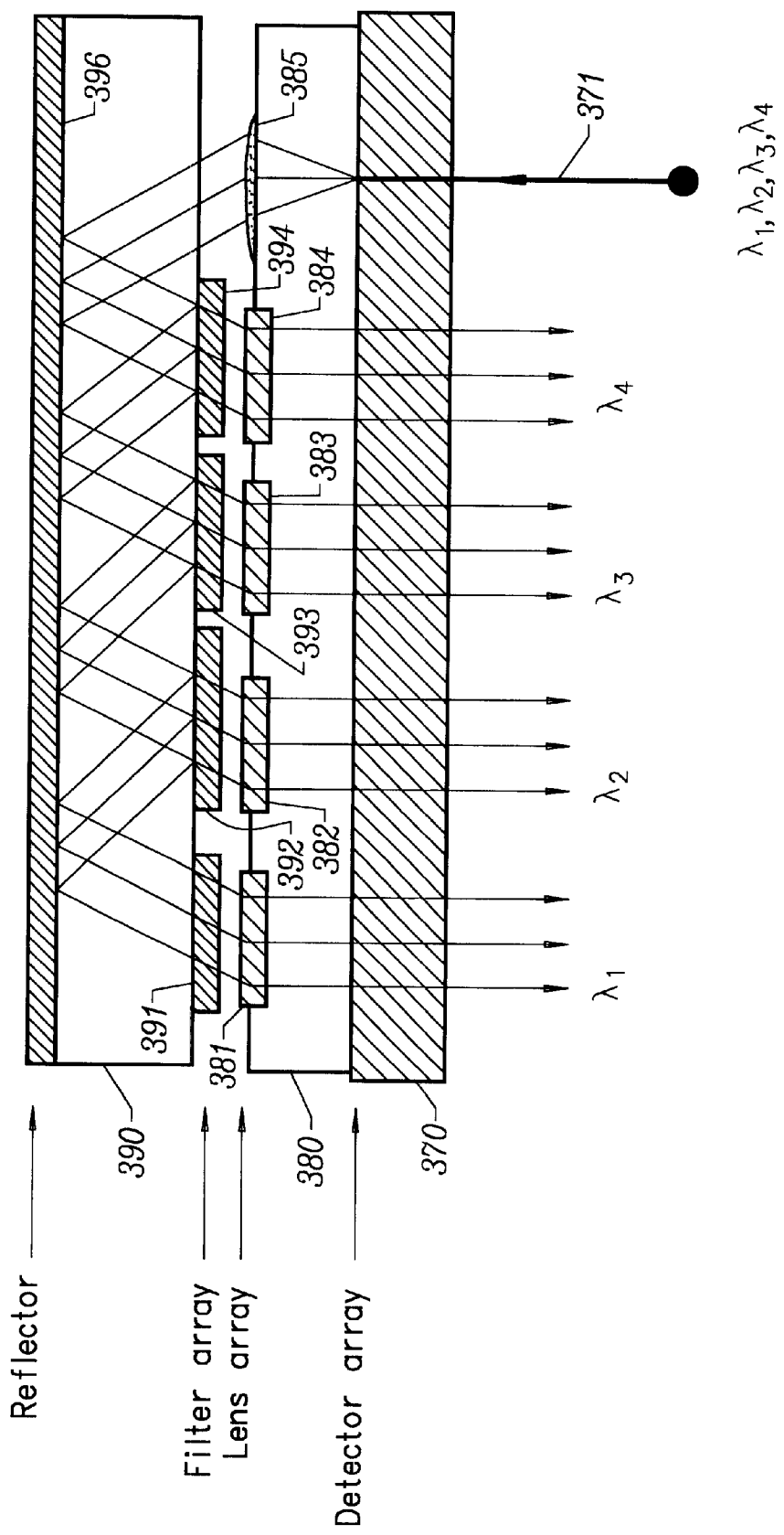

COST-EFFECTIVE WAVELENGTH DIVISION MULTIPLEXER AND DEMULTIPLEXER

BACKGROUND OF THE INVENTION

1. Field of the Invention

The present invention relates to optical communication and more specifically, it relates to a cost-effective wavelength division multiplexer and demultiplexer for use in optical communication. An embodiment of the invention consists of three modules, including a fiber array, a lens array and a filter array/reflector.

2. Description of Related Art

A wavelength division multiplexer (WDM) may be used to combine or separate optical signals having different wavelengths. For example, a two channel WDM can be used to combine two optical signals or to separate an incoming signal into two components that have two different wavelengths.

In optical communications, WDMs have many applications. For example, conventional WDMs are often used for simultaneous transmission of a plurality of optical signals over a single fiber. A conventional WDM may combine the signals having, e.g., wavelengths of 1310 nm and 1550 nm prior to transmission over a single fiber and separate the signals at the receiver.

The cost of providing optical fibers to carry an optical signal between points introduces a large cost in optical communications technology. To reduce this cost, a trend is seen towards carrying more signals on a single fiber rather than providing additional fibers. As a result, the demand for WDMs used to separate or combine such signals has dramatically increased. As the number of signals per fiber increases, the wavelength of each signal becomes closer to the wavelength of neighboring signals. In response to this decrease in spacing between signals, dense WDMs have been developed. Dense WDMs typically separate or combine optical signals having only small differences in wavelength. The difference between wavelengths of neighboring signals in a dense WDM is typically less than 3.2 nm.

In addition to combining and separating closely spaced signals, WDMs must be reliable and perform well in the environment in which they are placed. For example, there are always transmission losses associated with a conventional WDM. These transmission losses should be small and remain constant throughout operation of the WDM. However, the temperature of the environment in which the WDM operates can vary. Thus, a WDM should have a small transmission loss that is relatively insensitive to temperature. A WDM should also be reliable.

Accordingly, what is needed is a system and method for providing a WDM that has improved reliability, is compact and easily manufactured at low cost. The present invention addresses such a need.

SUMMARY OF THE INVENTION

It is an object of the present invention to provide a cost-effective wavelength-division multiplexer and/or demultiplexer.

It is another object of the present invention to provide a cost-effective method for fabricating a wavelength-division multiplexer and/or demultiplexer.

It is another object of the invention to provide a cost-effective wavelength-division multiplexer and/or demultiplexer that requires no active alignment or minimum alignment.

The invention is a cost-effective wavelength division multiplexer for use in optical communication. Multiple embodiments are disclosed. One embodiment of the device consists of three modules, including a fiber array, a lens array and a filter array/reflector. Each array is made in wafer level with very precise position control. The three modules are bonded together by conventional wafer bonding techniques that require no active alignment. Each wafer can contain thousands of devices, enabling their manufacture in large quantities at low-cost.

Several advantages are provided by the invention. In addition to eliminating the need for active alignment in the manufacturing process of a wavelength division multiplexer (WDM) transceiver, the invention reduces the footprint of such a device to the order of a few millimeters and the process is suitable for low-cost, large quantity manufacturing.

Although an embodiment is shown which couples four lasers of different wavelength into a fiber, this invention is not limited to the coupling of four lasers, but may be altered to multiplex any desired number of laser wavelength combinations. The whole device consists of three different modules, including a fiber array, lens array and filter array/reflector. The fiber array is connected to the light sources, which optimally are fiber pig-tailed semiconductor lasers. In this way, the light source can be repeatably and accurately placed to the right position in reference to the lens array.

Each fiber is inserted into a separate hole and bonded to the substrate that makes up the fiber array. An alternate to the fiber array formed with a single piece of substrate, two opposing V-grooves may hold the fiber. The input lenses and the output lens on the lens array could be either diffractive or refractive lenses. The input lenses are used to collimate the beams such that light will travel from the lenses at an angle and zigzag between the reflector and the filter array of the filter array/reflector. An output lens is used to focus the beams from each different laser for coupling into a fiber.

The filter array preferably includes edge filters, but may also use narrow-band filters that pass the light of one specific wavelength and reflect the light of the other wavelengths. One embodiment utilizes narrow-band filters having wavelength passbands of about 10 nm. Also, discrete bandpass filters, linear variable bandpass filters, and variable bandpass filters may be used.

The three modules of the invention are built independently. Each light source has to be aligned to its corresponding lens to the accuracy of micrometers. Since the fiber array and lens array are made by standard photolithographic technology, the spacing between elements can be very precisely set (in tens of nanometers). After all the three modules are made, a standard wafer bonding technique is used to bond them to each other. As an alternate approach, one could actively align the fiber optics array to the lens array, to make the positioning between the fiber array and the lens array more accurate prior to bonding. The lens array may be bonded to the filter array/reflector by a variety of techniques. After all the three arrays are bonded to each other, they may be A diced into individual micro optical devices.

BRIEF DESCRIPTION OF THE DRAWINGS

FIG. 17 is similar to that of FIG. 16, except that the lenses of FIG. 16 are replaced with gratings.

DETAILED DESCRIPTION OF THE INVENTION

The invention is a wavelength division multiplexer and demultiplexer for use in optical communication. The device may be fabricated with a cost-effective manufacturing technique that does not require active alignment and is suitable for mass production.

As required, detailed embodiments of the present invention are disclosed herein. However, it is to be understood that the disclosed embodiments are merely exemplary of the present invention, which may be embodied in various systems. Therefore, specific details disclosed herein are not to be interpreted as limiting, but rather as a basis for the claims and as a representative basis for teaching one skilled in the art to variously practice the present invention.

General Description

Multiple embodiments of a wavelength division multiplexer and demultiplexer are disclosed. An embodiment of the device consists of three modules, including a fiber array, a lens array and a filter array/reflector. Each array is made in wafer level with very precise position control. The three modules are bonded together by conventional wafer bonding techniques. Since the entire process utilizes photolithographic techniques incorporated with wafer bonding, no active alignment is required. Each wafer can easily contain thousands of devices, enabling their manufacture in large quantities at low-cost.

Several advantages of this invention ate readily apparent. This manufacturing technique effectively gets rid of the active alignment in the manufacturing process of a wavelength division multiplexer (WDM) transceiver. It reduces the footprint of such a device to the order of a few millimeters and the process is suitable for low-cost, large quantity manufacturing.

Figure 1:
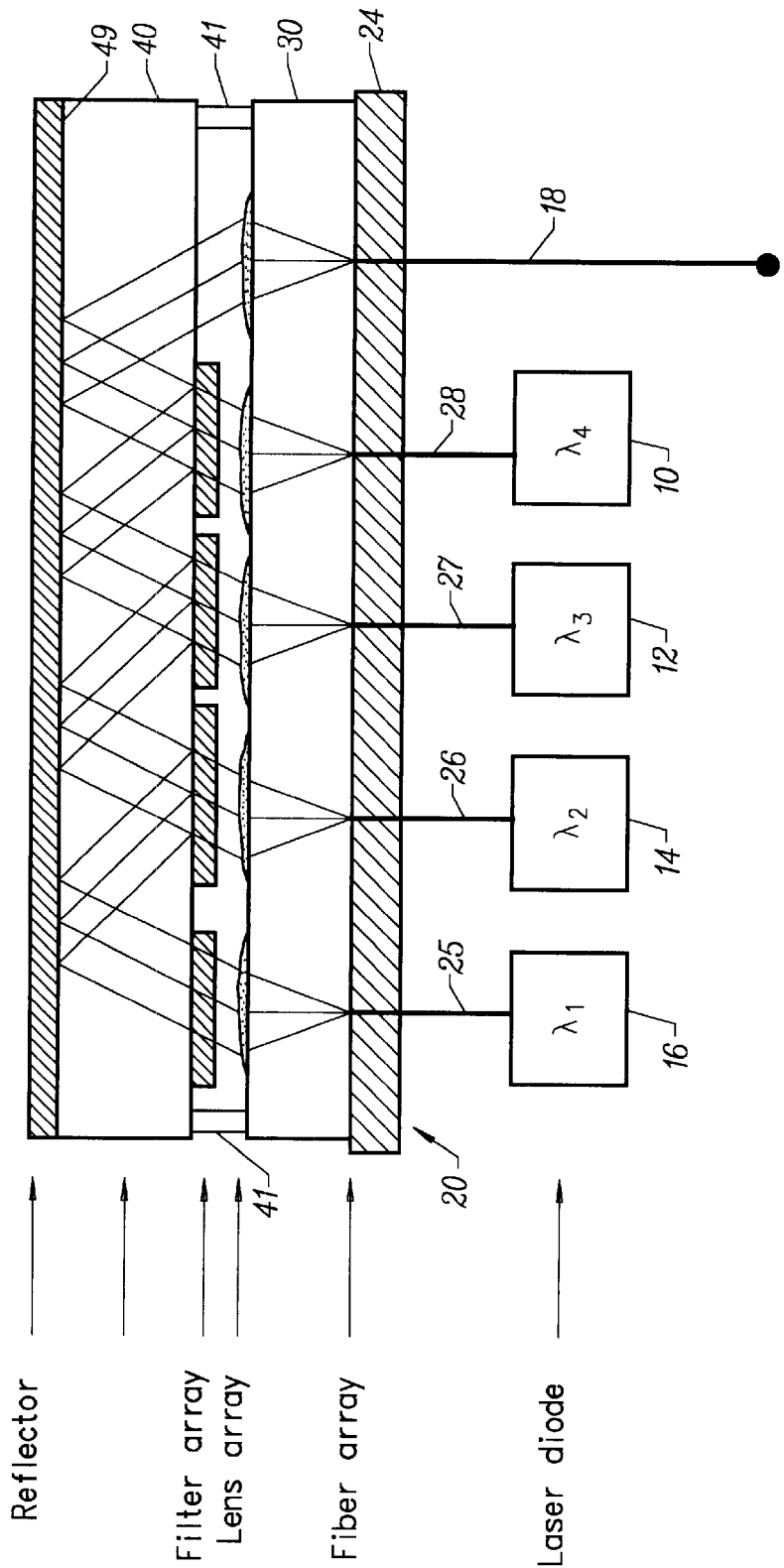
FIG. 1 shows a schematic of an embodiment of the multiplexer of the present invention.
Figure 2:
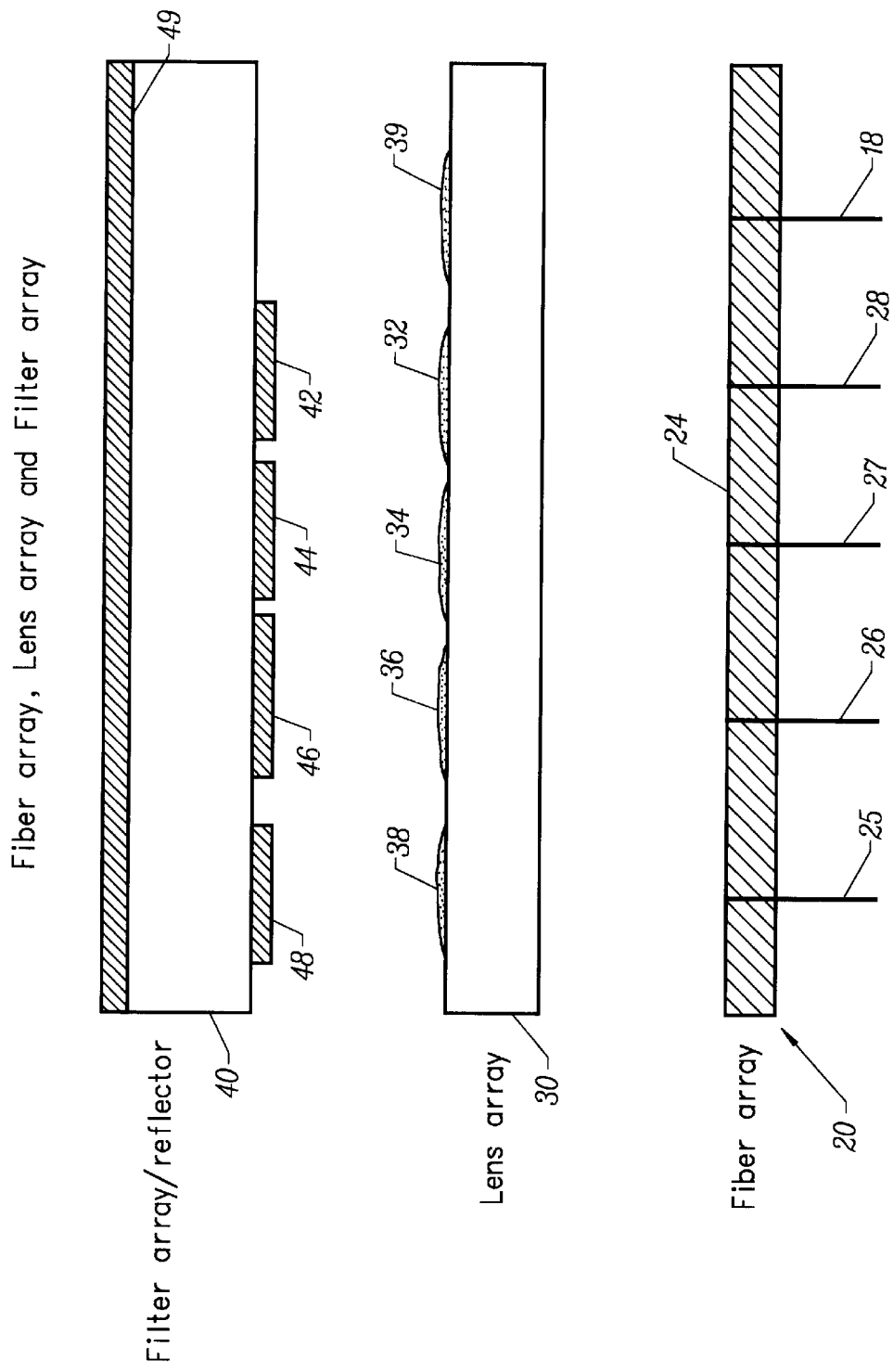
FIG. 2 shows details of the fiber array, lens array and filter array/reflector.

FIG. 1 shows a schematic of an embodiment of the multiplexer of the of different wavelength into a fiber 18, this invention is not limited to the coupling of four lasers, but may be altered to multiplex any desired number of laser wavelength combinations. The whole device consists of three different modules, shown in FIGS. 1 and 2. They are a fiber array 20, a lens array 30 and filter array/reflector 40. The fiber array is also generically referred to as an input/output array. The fiber array is connected to the light sources (10, 12, 14 and 16 shown in FIG. 1), which optimally are fiber pig-tailed semiconductor lasers. In this way, the light source can be repeatably and accurately placed to the right position in reference to the lens array 30.

The fiber array 20 is made by first drilling holes through a substrate 24, such as a silicon substrate 24, and then each fiber (25, 26, 27, 28 and 18) is inserted into a separate hole and bonded to the substrate. The input lenses 32, 34, 36 and 38 and the output lens 39 on the lens array 30 could be either diffractive or refractive lenses. The input lenses are used to collimate the beams such that light will travel from them at an angle and will zigzag between the reflector 49 and the filter array, which comprises filters 42, 44, 46 and 48 of reflector/filter array 40. Output lens 39 is used to focus the beams from each different laser for coupling into fiber 18.

In the preferred embodiment, edge filters make up the filter array. Each edge filter 42, 44, 46 and 48 passes the light either above or below a specific wavelength and reflects the light of wavelengths either above or below that wavelength. An alternative embodiment utilizes narrow band-pass filters having wavelength passbands of about 10 nm.

The above three modules are built independently. Each light source has to be aligned to its corresponding lens to the accuracy of micrometers. Since the fiber array 20 and lens array 30 are made by standard photolithographic technology, the spacing between elements can be very precisely set (in tens of nanometers). After all three modules are made, a standard wafer bonding technique is used to bond them to each other. If desired, one could actively align the fiber optics array to the lens array prior to bonding. A spacer or post 41 may be placed at the outer periphery between the lens array and the filter array/reflector and the bonding material may be applied to the spacer. An air cavity is thereby provided between the lens array and the filter array. Alternately, the lens array may be bonded to the filter array/reflector by abutting the lenses to the filters and bonding the edges of the device. A preferable alternative is to etch the lens array below the surface of the silicon substrate such that the top of the lens is a few microns below the top of the substrate. After all the three arrays are bonded to each other, they may be diced into individual microoptical devices.

As an alternate to the fiber array in a single piece of substrate, two opposing V-grooves may support the fiber.

Figure 3A:
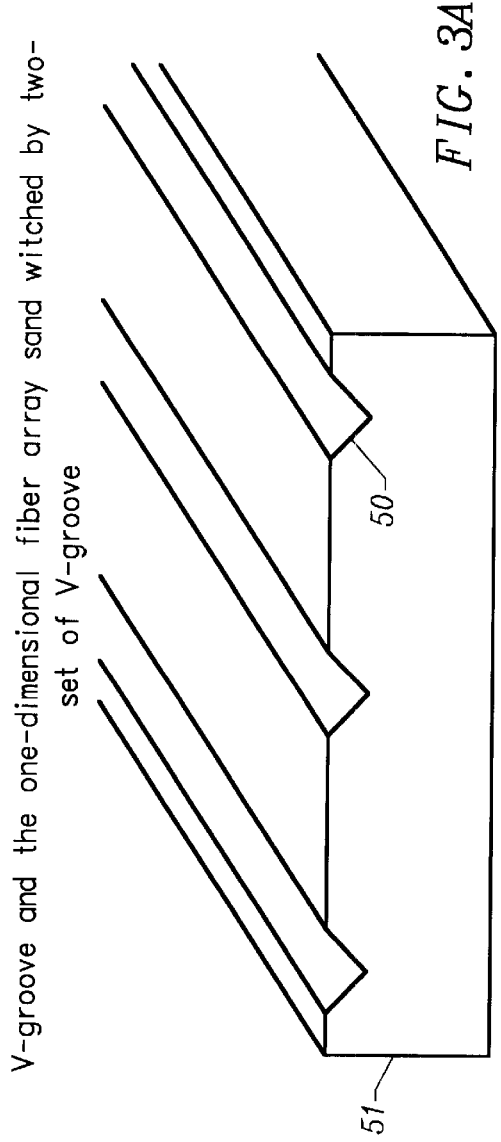
FIG. 3A shows a V-groove for use as a fiber mount.
Figure 3B:
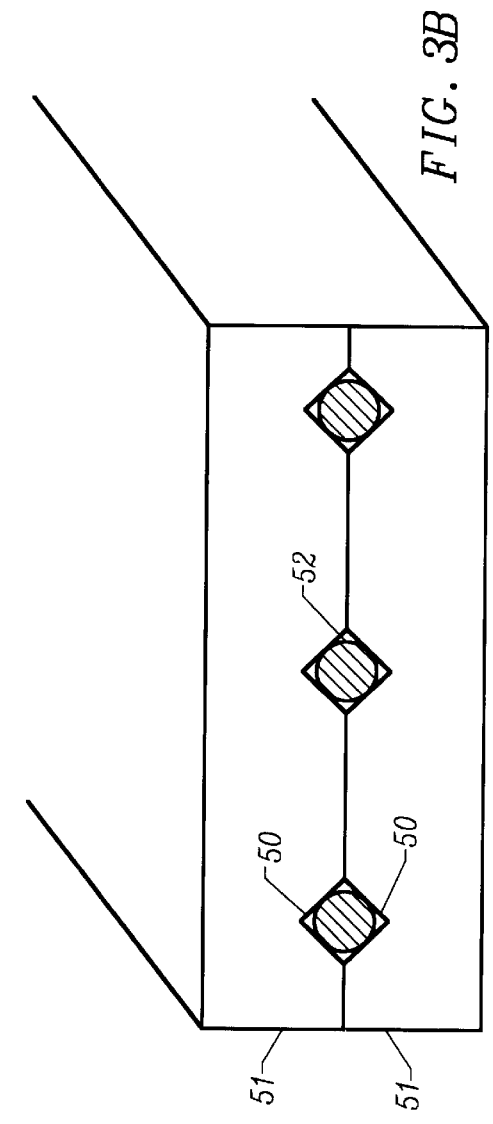
FIG. 3B shows opposing V-grooves holding a fiber to precisely register the position of the fiber.

FIG. 3A shows the V-grooves 50 in a silicon substrate 51. FIG. 3B shows how opposing V-grooves 50 in silicon substrates 51 sandwich the fiber 52 to precisely register its position. The V-groove 50 can be made by a standard photolithographic process. Methods for making the v-grooves described above and other types of v-groove fiber mounts usable in the present invention are described in U.S. Pat. No. 5,692,089 titled "Multiple Fiber Positioner For Optical Fiber Connection" and U.S. Pat. No. 4,511,207 titled "Fiber Optic Data Distributor", the disclosures both of which are incorporated herein by reference.

Specific Description

Figure 4A:
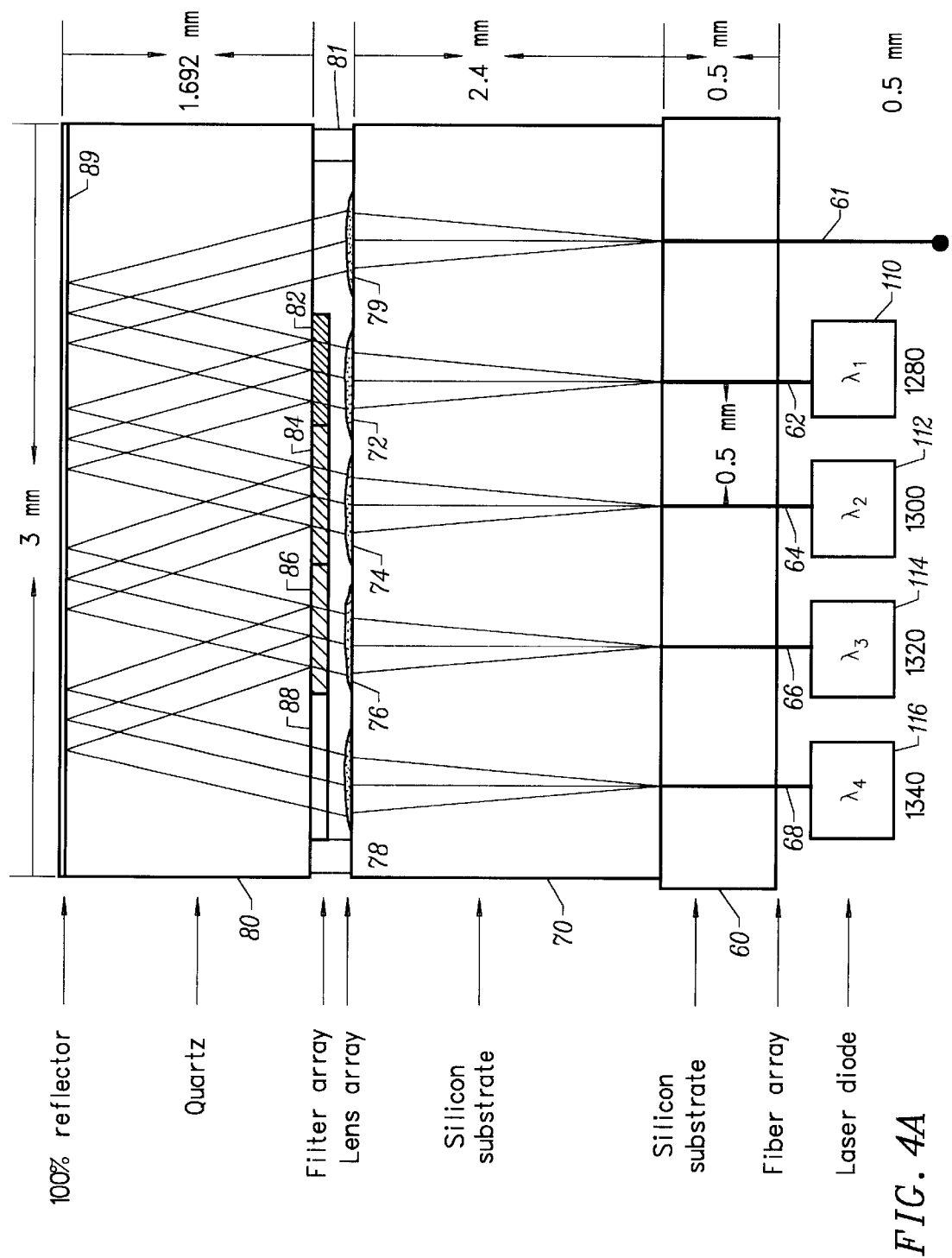
FIG. 4A shows a 4-channel single-mode wavelength division multiplexer.

FIG. 4A shows a 4-channel single-mode wavelength division multiplexer. In this design, there are three independent modules, including a fiber array 60, a lens array 70 and a filter array/reflector 80. In order to obtain high precision position control, diffraction lenses 72, 74, 76, 78 and 79 are used. In this embodiment, lasers 110, 112, 114 and 116 are fiber pigtailed diode lasers which produce wavelengths of 1280 nm, 1300 nm, 1320 nm and 1340 nm respectively. Lasers 110, 112, 114 and 116 are connected via the fiber pigtail to fibers 62, 64, 66 and 68, respectively, which have each been inserted and bonded into holes in the substrate of fiber array 60. In this embodiment, fiber 62, 64, 66 and 68 are separated by 0.5 mm and substrate is 0.5 mm thick by 3 mm wide.

In one embodiment which corresponds to the structure shown in FIG. 4A, the lens array 70 is 2.4 mm thick and 3 mm wide. The diffractive lenses 72, 74, 76, 78 and 79 are fabricated through conventional photolithography techniques so that the optical axis or lens center of each lens will be aligned with fiber 62, 64, 66, 68 and 61 respectively when lens array 70 is aligned with fiber array 60. Such conventional photolithography techniques are known in the art and some examples are described in U.S. Pat. No. 5,871,888 titled "Method Of Forming Multiple-Layer Microlenses And Use Thereof," U.S. Pat. No. 5,605,783 titled "Pattern Transfer Techniques For Fabrication Of Lenslet Arrays For Solid State Imagers" and U.S. Pat. No. 5,977,535 titled "Light Sensing Device Having An Array Of Photosensitive Elements Coincident With An Array Of Lens Formed On An Optically Transmissive Material," the disclosures of which three patents are incorporated herein by reference.

The filter array/reflector combination 80, shown in FIG. 4A, comprises either an edge filter or bandpass filter 82, 84, 86 and 88 associated with each lens 72, 74, 76 and 78 respectively. Each bandpass is chosen to pass the wavelength of light that is collimated by its associated lens, and is reflective at the wavelengths collimated by the other lenses of lens array 70. The reflective coating 89 is selected to be broadband or to at least be highly reflective over the range of selected wavelengths (in this case 1280 nm to 1340 nm). The filter array/reflector, in this embodiment, is made of fused silica and is 1.692 mm by 3 mm. The reflective coating may be formed onto the fused silica substrate by conventional methods such as sputter deposition, gaseous diffusion or other known methods. Lens array 70 and filter array/reflector 80 are bonded together with posts 81. The length of each post 81, in the shown embodiment, is set at about 200 μm to 300 μm.

The operation of the invention can be understood with reference to FIG. 4A. Laser light from diode laser 116 is coupled into fiber 68 from which it diverges and is collimated by lens 78, and propagates therefrom at an angle, to pass through filter 88 and then reflects from reflective coating or surface 89 to reflect in a zig-zag pattern from filter 86 to reflector 89 to filter 84 to reflector 89 to filter 82 and to reflector 89 from which the beam passes through lens 79 and is focused and collected by input/output lens 61. Laser light from each of the remaining diode lasers 114, 112 and 110 follows a similar path through its respective fiber and lens to propagate substantially collinearly with the light beam from diode laser 116 and to eventually be focused by lens 79 into fiber 61. The system can operate in reverse to de-multiplex multiple wavelength light propagating from fiber 61 toward input/output lens 79. In such a system, the fibers 62, 64, 66 and 68 would not be connected to a diode laser.

Figure 4B:
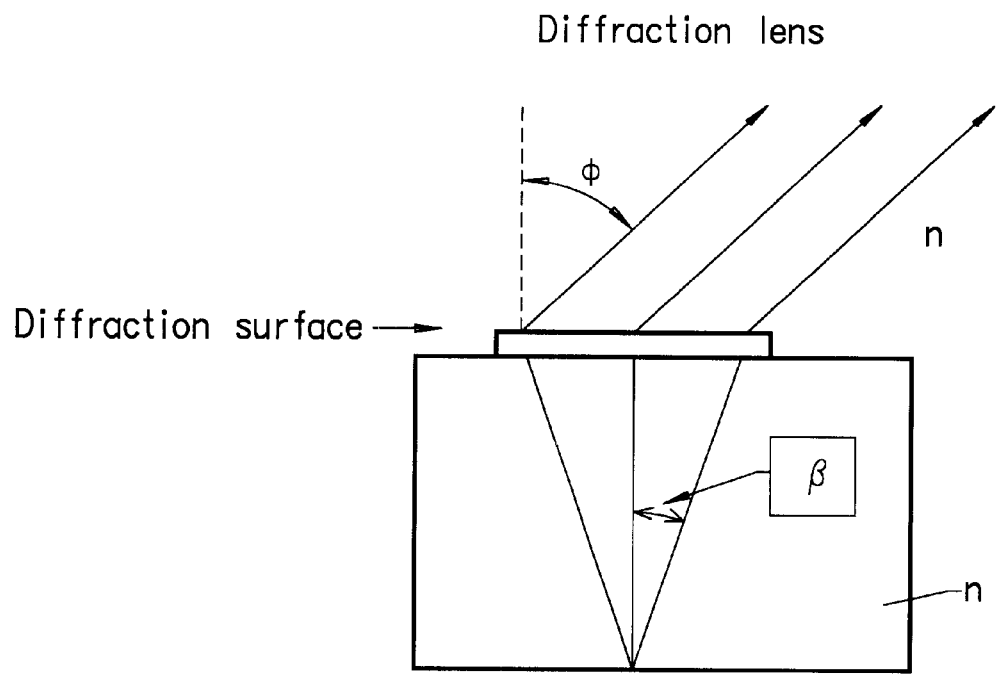
FIG. 4B illustrates the effect of a diffractive lens on light originating from the focal point of the diffractive lens.

Referring to FIG. 4B, the numerical aperture of this lens is n·sin β, and the light coming out of the lens is collimated and makes an angle Φ to the normal of the substrate. A diffraction lens could be considered as a grating with a different or changing period across its pupil. Differing grating periods bend light differently. By controlling the spatial distribution of the grating period, one can make the complex diffraction surface to behave like a regular refraction lens.

Figure 4C:
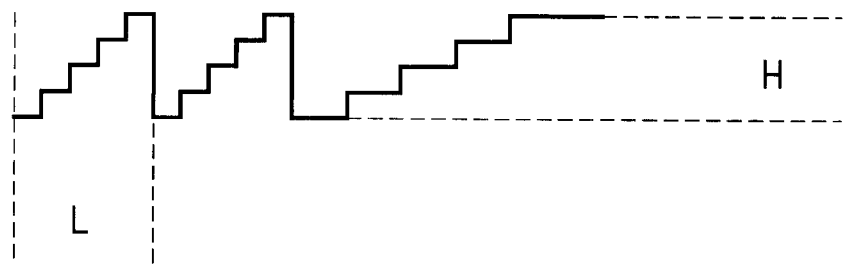
FIG. 4C shows the parameters of a diffractive lens.

Referring to FIG. 4C, the period is L and therefore the minimum period is $L_{min}$ and the period near the center of the lens is $L_c$. The modulation depth is H. The relationships of these parameters are described as follows.

$$L_{min} = \frac{\lambda}{n\sin\beta + \sin\Phi} = \frac{\lambda}{NA + \sin\Phi}$$

$$L_c = \frac{\lambda}{\sin\Phi}$$

$$H = \frac{\lambda}{n-1}$$

The beam divergence angle is given by $$\psi = \frac{\lambda}{n\pi W_o},$$

where Wo is the radius of the beam at the 1/e² point of power. In one embodiment, λ=1.3 μm, NA=0.15, sin Φ=0.21 and Wo=4.7 μm. The results of both silicon and glass are listed in table A1.

TABLE 1

|  | Silicon (n = 3.5) | Glass (n = 1.5) |
| --- | --- | --- |
| Lmin | 3.61 μm | 3.61 μm |
| H | 0.52 μm | 2.6 μm |
| Lmin/8 | 0.45 μm | 0.45 μm |
| H/8 | 0.065 μm | 0.325 μm |
| Beam divergent angle | 1.44° | 3.36° |

It is seen from Table 1 that the modulation depth of silicon is 5 times smaller that that of the glass and the divergence angle is 2.3 times smaller.

The diffraction lens is a wavelength-sensitive optical device. Both the focal length and the diffraction angle are dependant upon the wavelength. The collimating lenses may be designed for each specific wavelength. However, the final lens is commonly used for focusing the light to couple it into the fiber. This lens has to face the chromatic effect no matter how the collimating lenses are designed. In this 4-channel device, the difference between the maximum (1340 nm) and minimum (1280 nm) wavelength is about 4.58% of the central wavelength (1310 nm), causing significant shift in both focal point and diffraction angle. General design strategies may be ascertained from the specific design described with respect to FIG. 4A as follows.

1. The channel pitch (fiber separation) can be constant or non-constant; in the current design, the spacing is fixed at 500 µm.

2. Design the first four diffractive lenses 72, 74, 76 and 78 (the collimating lens) to be identical with respect to grating period and modulation depth and design the fifth lens 74 (the focusing lens) to be the mirror image of the collimating lenses. Under this condition, the chromatic angular shift generated from the collimating lens can be exactly cancelled by the focusing lens.

Figure 5A:
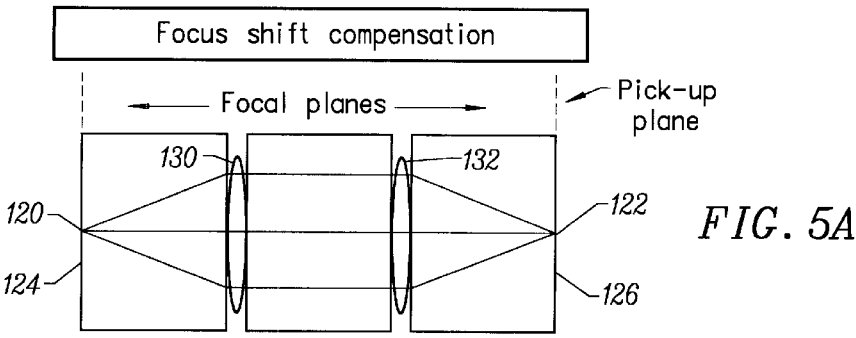
FIGS. 5A–5D illustrate a design principle of the present invention where the focus shift generated from the chromatic effect is compensated with the focus shift caused by the propagation distance.
Figure 5B:
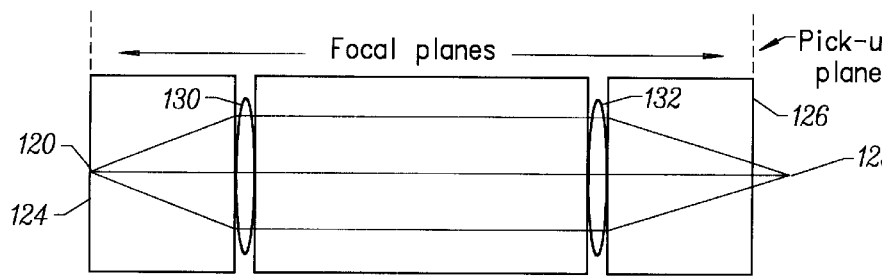
Figure 5C:
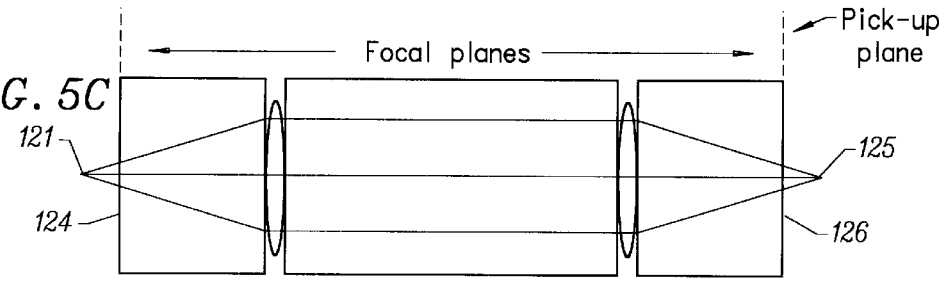
Figure 5D:
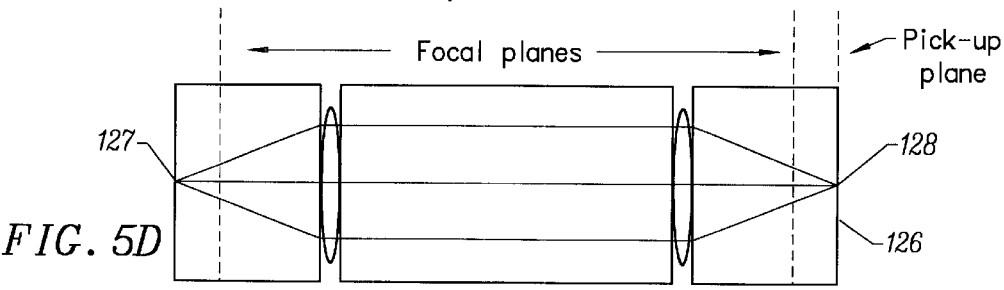

3. Compensate the focus shift generated from the chromatic effect with the focus shift caused by the propagation distance. The concept is explained in FIGS. 5A–5D. In FIG. 5A, the two-lens system, comprising lenses 130 and 132, is designed for short propagation distance for a wavelength of 1280 nm ($\lambda_1$ in FIG. 4A). The light source rays originating at 120 and their image at 122 are right at the front focal plane 124 and the back focal plane 126 respectively. In FIG. 5B, the same two lenses are used for the same wavelength (1280 nm) with much longer propagation distance. It is seen that the image 123 moves away from the back focal point of the focusing lens. However, the receiving fiber 61 (FIG. 4A) remains at the back focal plane 126. This causes a loss of coupling efficiency. In FIG. 5C, the wavelength remains 1280 nm and the propagation distance is increased, as in FIG. 5B, however, the light source rays point of origin 121 is moved a little bit away from the front focal point 124 so that the image 125 is off from the back point by the same amount. It becomes a symmetric image conjugate. In FIG. 5D, the wavelength of the light source is changed to 1340 nm. The chromatic effect shortens the focal length of these two lenses. Therefore, the front focal point 127 and back focal point 128 of these two lenses are all inside the substrate where the diffraction lenses are. The focus shift due to longer wavelength is compensated by the focus shift caused by long propagation. In the embodiment illustrated in FIG. 4A, lasers 110, 112, 114 and 116 are set at 1280 nm, 1300 nm, 1320 nm and 1340 nm respectively.

4. Make the diffraction lens from high index material. There are several advantages for choosing high index material. The modulation depth is low, which will allow higher diffraction efficiency and make it easier to fabricate the lenses. The beam divergence angle is smaller inside the high index material. The use of high index material, such as silicon, allows for larger tolerances of the substrate thickness and allows for greater focal length error.

5. Minimize the angle of the collimated beam out of the diffraction lenses. The larger the diffraction angle, the lower the lens efficiency will be. To minimize the diffraction angle but keep the same channel pitch, one can either decrease the index of refraction of the substrate for the filter array/reflector 80 or increase its thickness.

6. Minimize the beam shift on the entrance pupil of the final (focusing) lens 79. Since beams from different channels zigzag at different angles, they will hit the final lens at different locations. The minimization is done by choosing an appropriate thickness for filter array/reflector 80. The effect of beam shift away from the center of the final lens (lens 79) is discussed below.

7. Apply an AR coating to both sides of, the lens array to obtain maximum light efficiency.

TABLE 2

Substrate thickness and index of refraction for one embodiment.

| Module | Substrate | Thickness | Refraction index |
|---|---|---|---|
| Fiber array | Silicon | 0.50 mm | 3.5 |
| Lens array | Silicon | 2.400 mm | 3.5 |
| Filter array/ Reflector | Fused silica (quartz) | 1.692 mm | 1.44 |

The thickness of filter array/reflector is chosen so that when the incident angle in air=12.183°, the channel pitch= 500 µm. This will minimize the beam shift on the final lens.

As discussed above the first four diffraction lenses 72, 74, 76 and 78 (collimating lens) are designed to have the same period, and modulation depth and the fifth lens 79 (focusing lens) is designed to be the mirror image of the collimating lenses. The lenses are made on the silicon substrate of the lens array 70 and are designed for a wavelength of 1310 nm (middle point of 1280 nm and 1340 nm). Table 3 shows the lens parameters.

TABLE 3

| Lens array parameters | |
|---|---|
| Spacing between lenses | 500 µm |
| Lens diameter | 500 µm |
| Numerical aperture | 0.15 |
| Designed wavelength | 1310 nm |
| Focal length @ 1310 nm | 2.337 mm |
| Emergent angle @ 1310 nm | 12 degrees |
| Substrate | Silicon |
| Substrate index | 3.50 |
| Substrate thickness | 2.400 mm |
| Number of mask | 3 |
| Efficiency | 83% |

Since the lenses are designed for wavelength at 1310 nm, when they are used for wavelengths other than 1310 nm, both the focal length and the emergence angles are shifted. The amounts of shifting follow the formula shown below.

$$\Delta f = -f \frac{\Delta \lambda}{\lambda}$$

$$\Delta \Phi = \Phi \frac{\Delta \lambda}{\lambda}$$

In addition, since beams of different wavelengths zigzag at slightly different angles, beams from different channels will hit the final lens 79 (focusing lens) on a different location. The amounts of the beam shifts are described as follows.

$$\delta X(M) = M * [2 * D * \tan(\theta_M) - P],$$

where M (=1, 2, 3, 4) is the channel number. Channels of smaller numbers are closer to the focusing lens. In other words, the path length of a beam as it zigzags between the filters and reflector of filter array/reflector 80 is shorter for a channel that has a smaller number. The results of the chromatic effects are listed in Table 4.

TABLE 4

Various parameters of channels

| Channel number | 1 | 2 | 3 | 4 | Delta |
|---|---|---|---|---|---|
| Wavelength (nm) | 1280 | 1300 | 1320 | 1340 | |
| Focal length ($\mu$m) | 2390.5 | 2354.8 | 2319.2 | 2283.5 | 35.7 |
| Incident angle | 11.725° | 11.909° | 12.092° | 12.275° | 0.183° |
| Angle in glass | 8.113° | 8.239° | 8.365° | 8.490° | 0.127° |
| Beam shift $\delta X$ ($\mu$m) | −17.7 | −20.3 | −7.7 | 20.0 | |

The minimum feature size of the diffraction lens is $W=\lambda/(NA+\sin\Phi)$, where NA is the numerical aperture of the lens and $\Phi$ is the emergence angle of rays coming out of the diffraction lens (see FIG. 4B). In one embodiment, NA=0.15 and $\Phi$=12 degrees. The corresponding minimum feature size, W, is 3.61 $\mu$m. With an 8-step process using silicon as a substrate, the efficiency is about 83%. The modulation depth of the diffraction lens is $\lambda/(n-1)$, which is 0.52 $\mu$m for a silicon substrate.

The beam angle inside the filter array is given by $\theta=\sin^{-1}(1/n\cdot\sin\Phi)$, and the channel pitch is given by $P=2D\tan\theta$, where D is the thickness of the filter substrate. For a given channel pitch, a smaller index of refraction of the filter substrate will require a smaller angle $\Phi$. This will give more diffraction efficiency and less polarization effects in the filter.

The beam-shift does not change the position of the focus spot and the energy distribution; however, it will introduce a linear phase shift on the spot. The following analysis is based on scalar diffraction theory. For a low NA lens, this approach provides reasonable accuracy.

Figure 6:
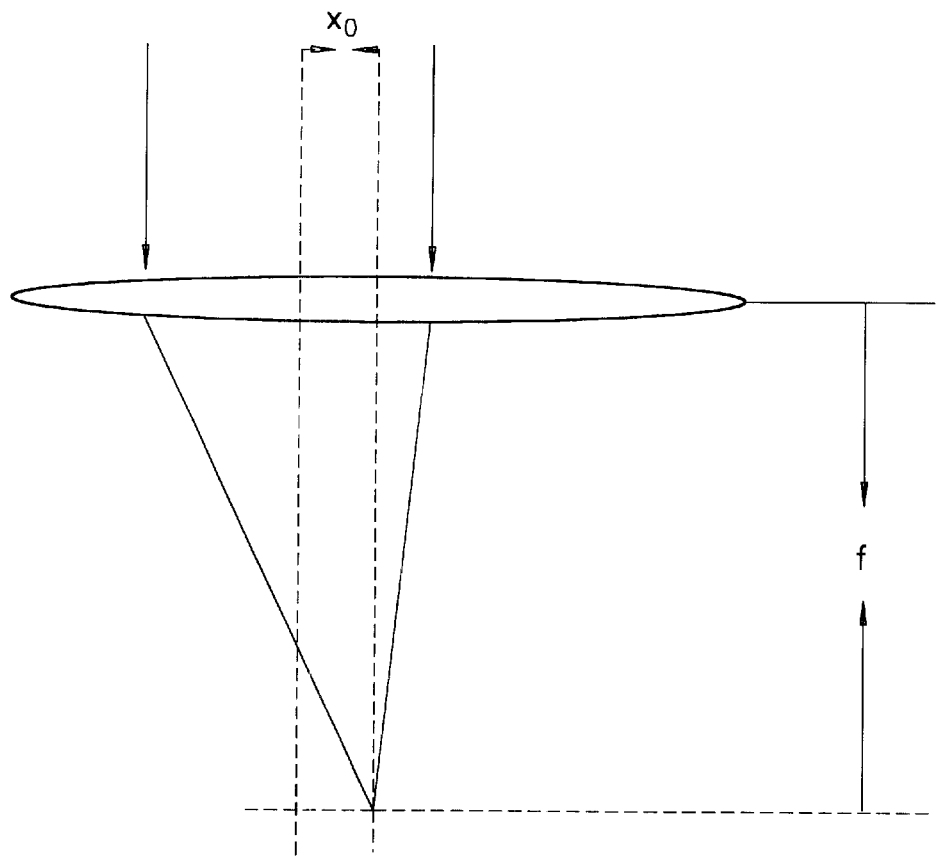
FIG. 6 shows a schematic of a beam off-center from a lens.

For on-axis and off-axis rays, the E-field distributions right before the lens are $U_o(x,y)$ and $U(x, y)=U_o(x-x_o, y)$, where $x_o$ is the E-field distribution off-center (see FIG. 6). At the focal plane, the corresponding E-field distributions are $S_o(x,y)$ and $S(x,y)$. Scalar diffraction analysis yields, $$S_0(x, y) = F[U(x, y)]_{\sigma_x = nx/\lambda f, \sigma_y = ny/\lambda f} = \sqrt{\frac{2}{\pi W_o^2}} \exp\left[-\frac{x^2 + y^2}{W_o^2}\right]$$

$$S(x, y) = F[U(x, y)]_{\sigma_x = nx/\lambda f, \sigma_y = ny/\lambda f} = F[U_0(x - x_0, y)]_{\sigma_x = nx/\lambda f, \sigma_y = ny/\lambda f}$$

$$= S_0(x, y)\exp\left[\frac{j2\pi n x x_0}{\lambda f}\right]$$

where Wo, $\lambda$, f are the Gaussian radius of the focused spot, the vacuum wavelength and the focal length of the lens respectively. The coupling efficiency is the projection of $S(x,y)$ to $S_o(x,y)$, yielding, $$\eta = \int S_o(x, y) \cdot S(x, y) dx dy = \exp\left[-\left(\frac{\pi n x_o W_o}{\lambda f}\right)^2\right]$$

Figure 7:
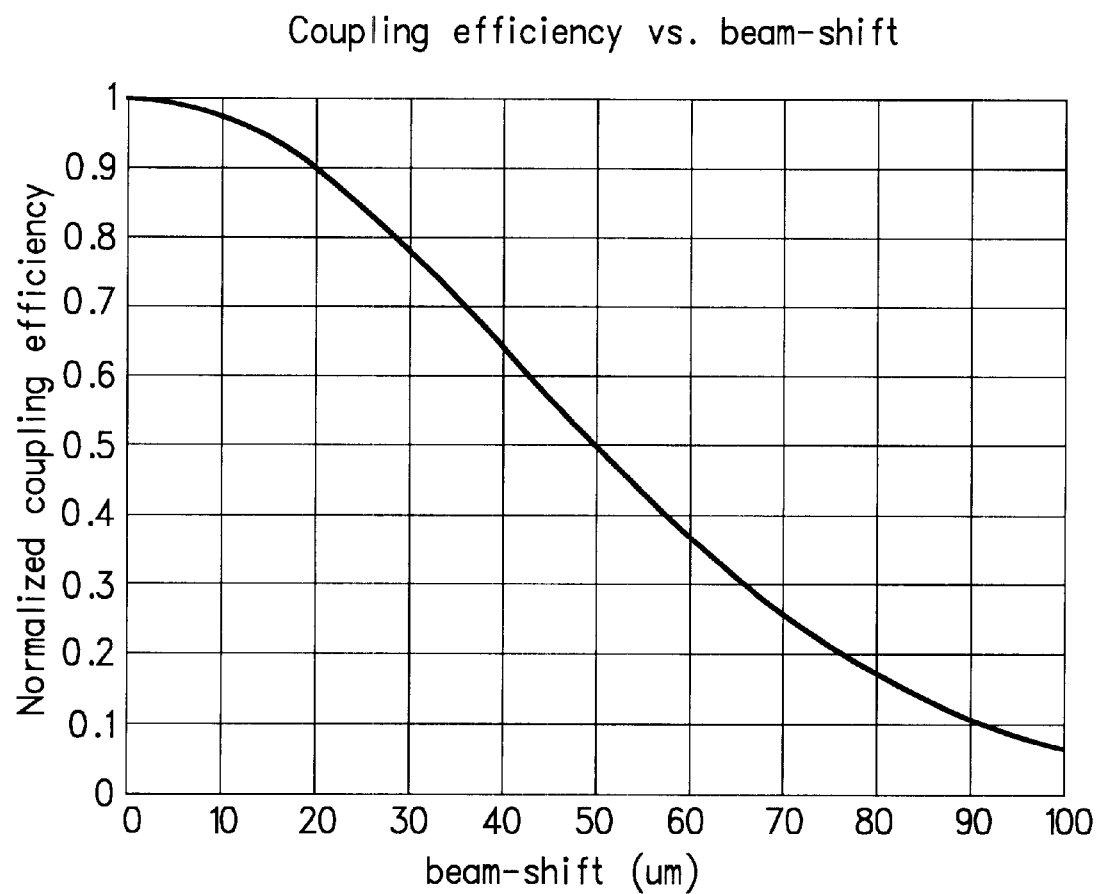
FIG. 7 shows the numerical results of the coupling efficiency when n=3.5, λ=1.3 μm, f=2.4 mm and Wo=4.7 μm.

FIG. 7 shows the numerical results when n=3.5, $\lambda$=1.3 $\mu$m, f=2.4 mm and Wo=4.7 $\mu$m. It is seen that in the current design, the beam-shifts in channels 1, 2 and 4 are each about 20 $\mu$m, which will cause a 10% efficiency loss.

The performance of the design parameters shown in tables 2, 3 and 4 are provided below.

Figure 8A:
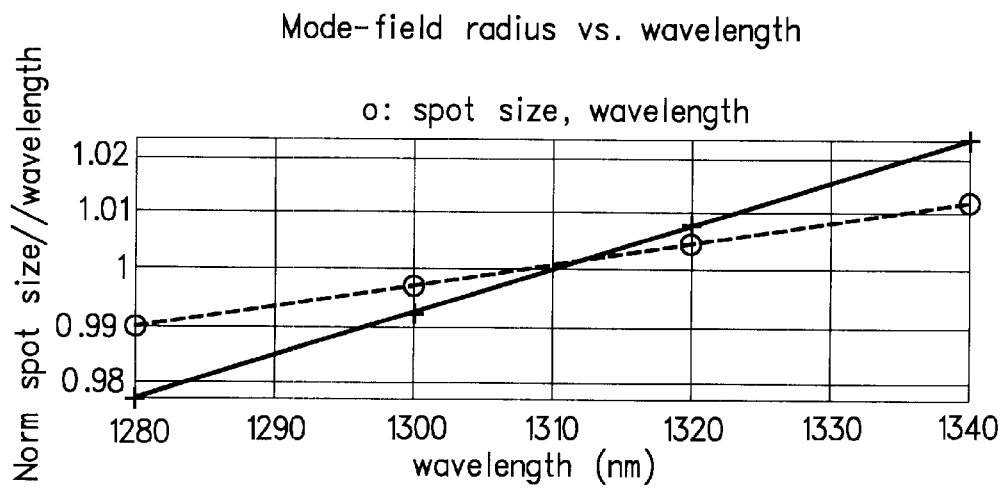
FIGS. 8A and 8B show the mode-field radius as a function of wavelength.
Figure 8B:
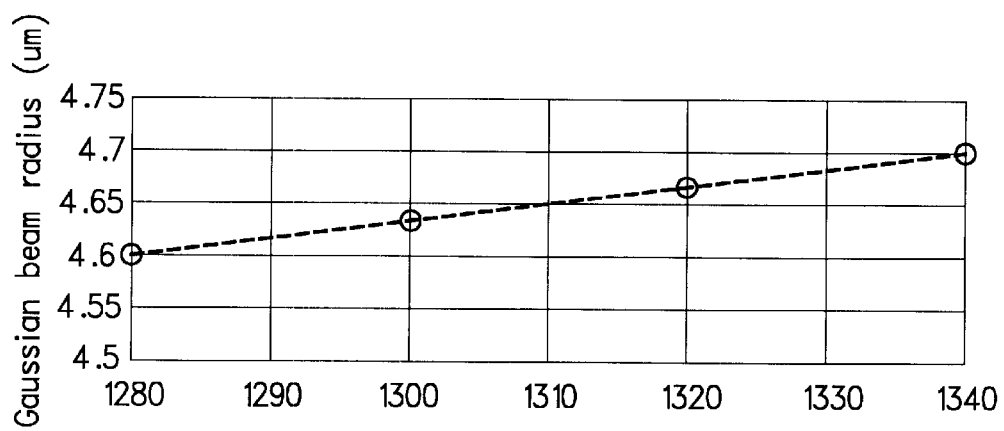

FIGS. 8A and 8B show the mode-field radius as a function of wavelength. FIG. 8A shows the spot size per wavelength and FIG. 8B shows the Gaussian beam radius per wavelength. It is seen that over 1280 nm to 1340 nm, the radius changes by only +/−1%.

Figure 9A:
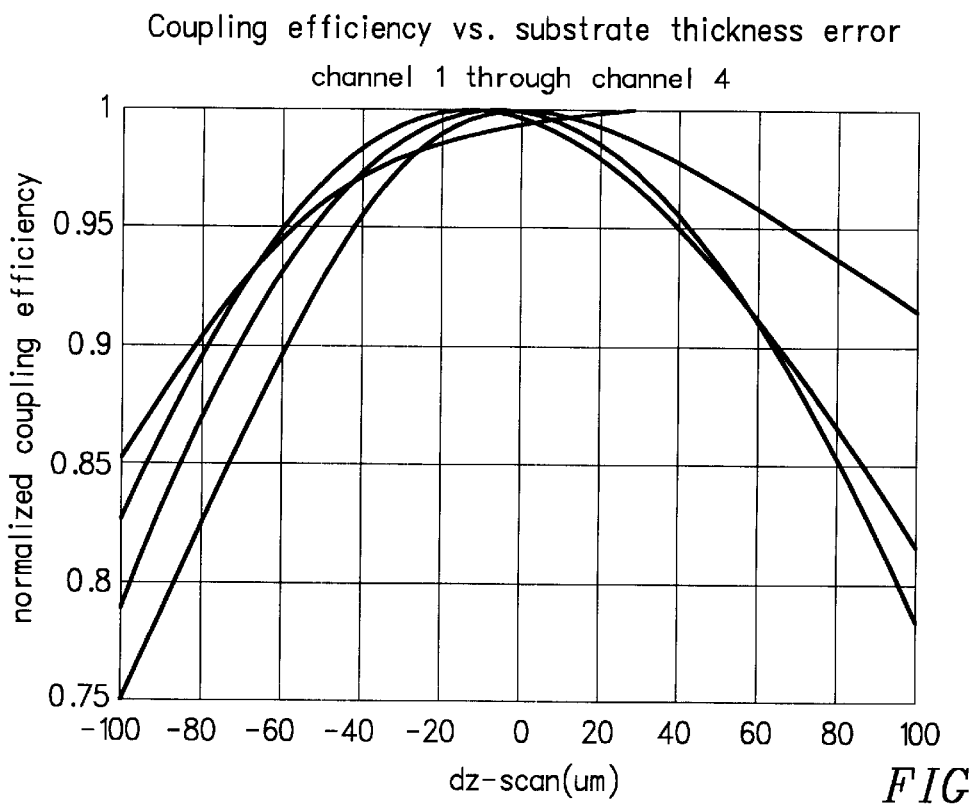
FIG. 9A shows the coupling efficiency as a function of substrate thickness variation.
Figure 9B:
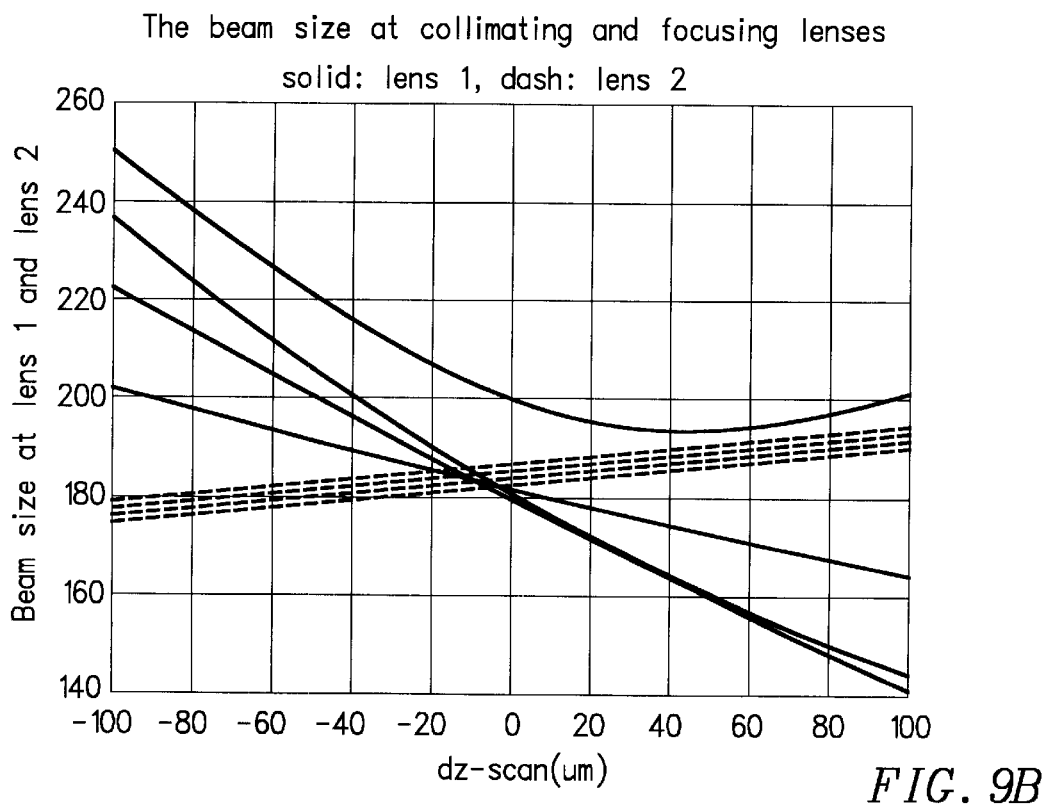
FIG. 9B shows the beam size at the collimating and the focusing lenses for four channels.

FIG. 9A shows the coupling efficiency as a function of substrate thickness variation. To obtain 95% of coupling efficiency, the thickness variation of a substrate for the diffraction lenses has to be less than +/−40 $\mu$m. FIG. 9B shows the beam size at the collimating and the focusing lenses for the four channels. The solid/dash curves are for the collimating lens and the focusing lens, respectively. Notice that near the nominal thickness (dz-scan=0), the beam size at the collimating lenses and the focusing lens are close. This indicates that the image system is nearly symmetric. If +/−20 $\mu$m is used as the thickness specification, the beam hits only 21 $\mu$m of a filter (the filter size is near 500 $\mu$m).

Figure 10:
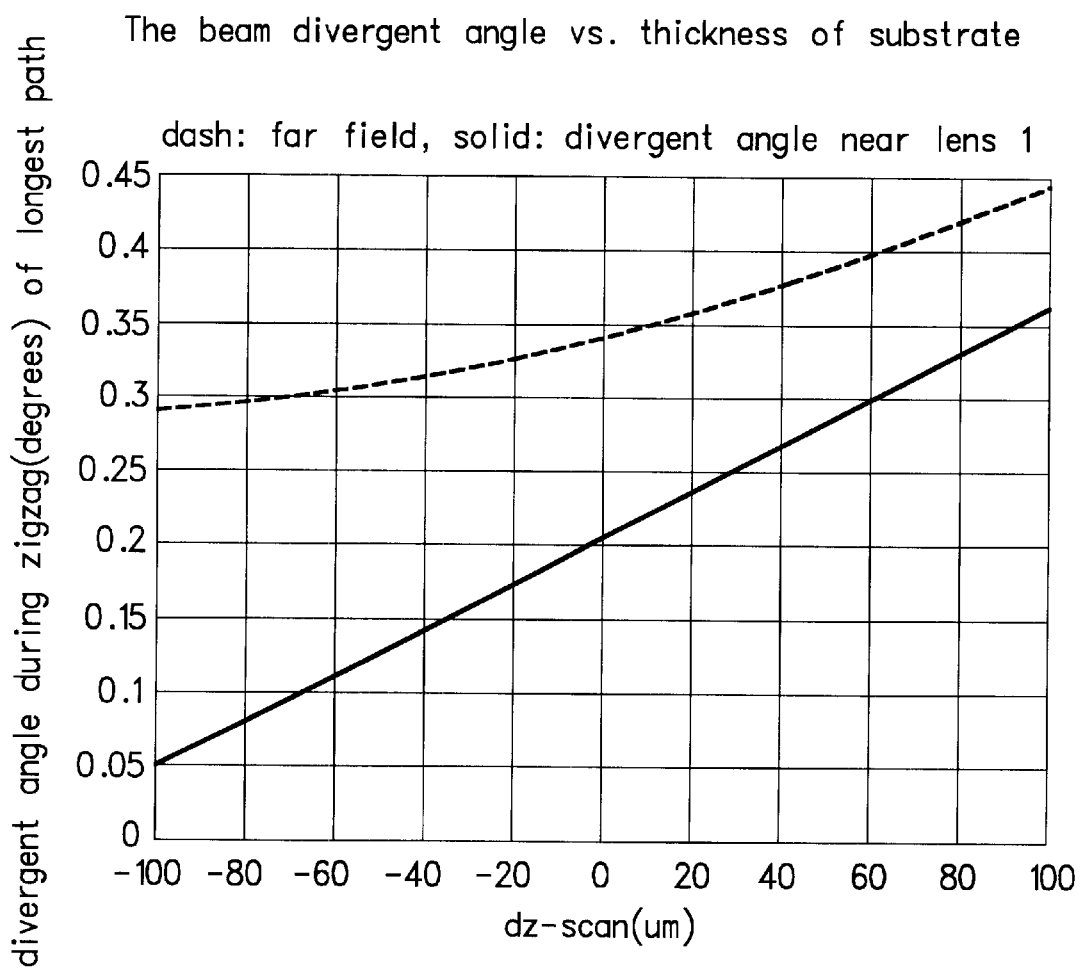
FIG. 10 shows the beam divergence angle of channel 4 vs. substrate thickness.
Figure 11:
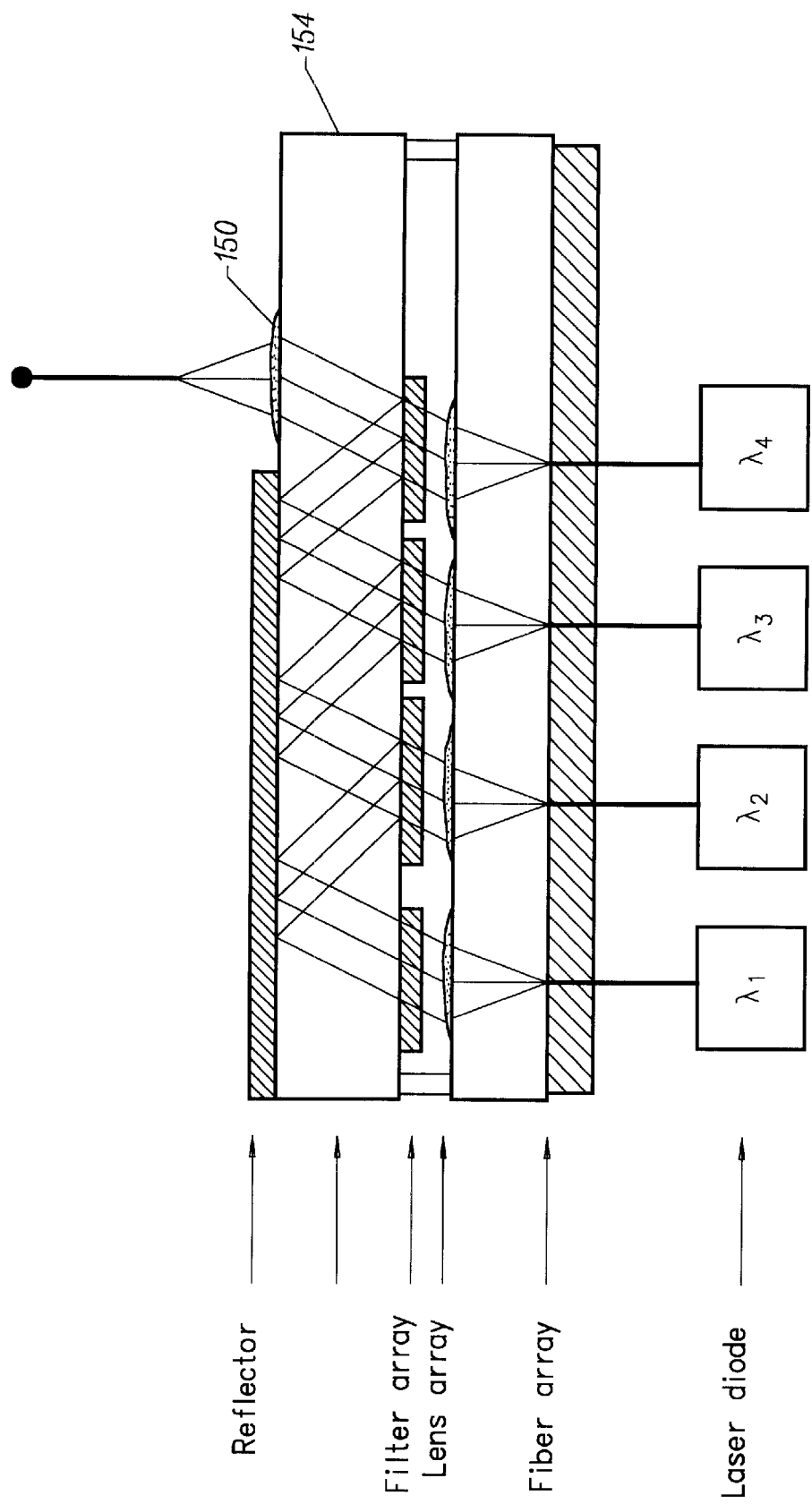
FIG. 11 an embodiment that is similar to the design shown in FIGS. 1 and 4, with the exception that the focusing lens and the fiber are located on the opposite side of the filter array/reflector.

FIG. 10 shows the beam divergence angle of channel 4 vs. substrate thickness. The solid curve shows the beam divergence angle at the collimating lens and the dashed curve shows the divergence angle of the far field. Again, for the spec of +/−20 $\mu$m, the divergent angle is about 0.23 degrees.

The specification of each filter used is determined by the laser parameter and the beam quality (divergence angle). The beam divergence in the collimating path (see FIG. 10) gives +/−0.23×1.44 degrees, and the chromatic effect of the diffraction lens gives +/−0.27 degrees (see Table 4). The total variation of angle of incident is about +/−0.6 degrees.

TABLE 5

| | |
|---|---|
| The variation of laser center wavelength | 1 nm |
| The wavelength changing over 90° C. | 9 nm |
| The center of pass-band error | 1 nm |
| Total variation | 11 nm |

Based on the data shown in Table 5, the specification of the filter is set in Table 6.

TABLE 6

Specification of filter

| | |
|---|---|
| Angle of incident from air | 12° ± 0.6 |
| Minimum bandwidth at 80% | 12 nm |
| Maximum bandwidth at 1% | 28 nm |

The specification has to be met for both P- and S-polarized light.

FIGS. 11–17 show alternate embodiments of the present invention. The devices described herein generally include an input/output array. The input portion of the input/output array may comprise at least one input fiberoptic or at least one laser diode. When the input portion utilizes at least one laser diode, the configuration usually includes a plurality of laser diodes. The output portion of the input/output array may comprise at least one fiber optic or at least one detector. When the output portion utilizes at least one detector, the configuration usually includes a plurality of detectors. The device shown in FIG. 11 operates substantially the same as the embodiment shown in FIGS. 1 and 4, with the exception that the focusing lens 150 and the fiber 152 are located on the opposite side of the filter array/reflector 154.

Figure 12:
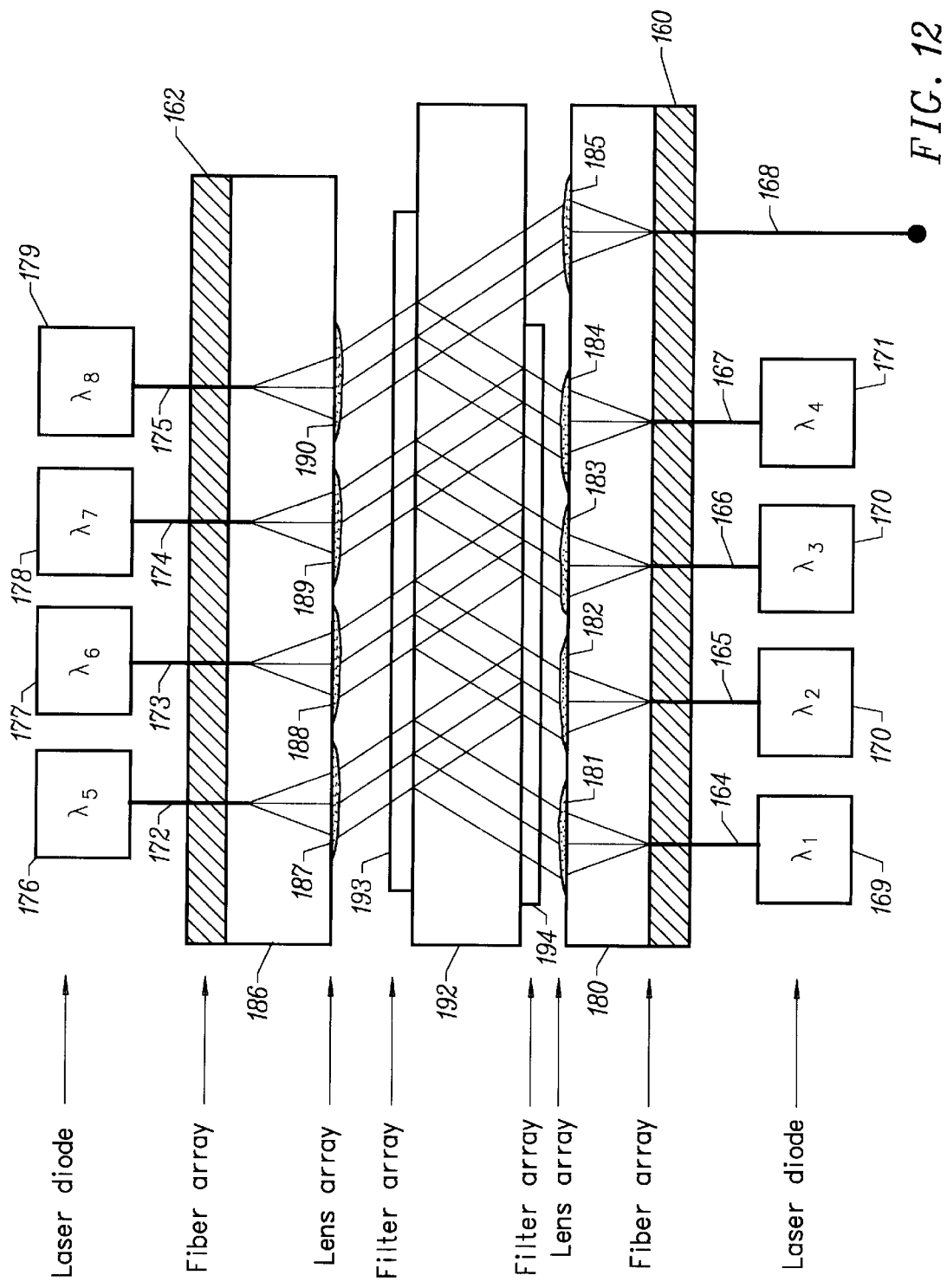
FIG. 12 shows an embodiment of the invention configured as an 8-channel multiplexer where the light enters the filter array from both sides.

FIG. 12 shows an embodiment of the invention configured as an 8-channel multiplexer where the light enters the filter array from both sides. The device includes two fiber arrays, 160,162. Fiber array 160 includes five fibers 164, 165, 166, 167 and 168. Fibers 164–167 are connected to laser diodes 169–171 respectively. Fiber array 162 includes four fibers 172–175. Fibers 172–175 are connected to laser diodes 176–179 respectively. Fiber array 160 is operatively connected to lens array 180, which includes lenses 181–185. Fibers 164–168 are operatively aligned to lenses 181–185 respectively. Fiber array 162 is operatively aligned to lens array 186, which includes lenses 187–190. Lenses 187–190 are operatively aligned to fibers 187–190 respectively. A filter array 192 comprising bandpass filters 193 and 194 is operatively aligned between lens arrays 180 and 86. Bandpass filters 193 and 194 may be discrete filters selected to pass only the wavelength of its associated lens or they may be linear variable filters. The device may operate as a multiplexer, with light provided by lasers 169–171 and 176–179 or the device may alternately operate as a demultiplexer, with multi-wavelength light entering the system through fiber 168. The demultiplexer mode would not include the lasers.

Figure 13:
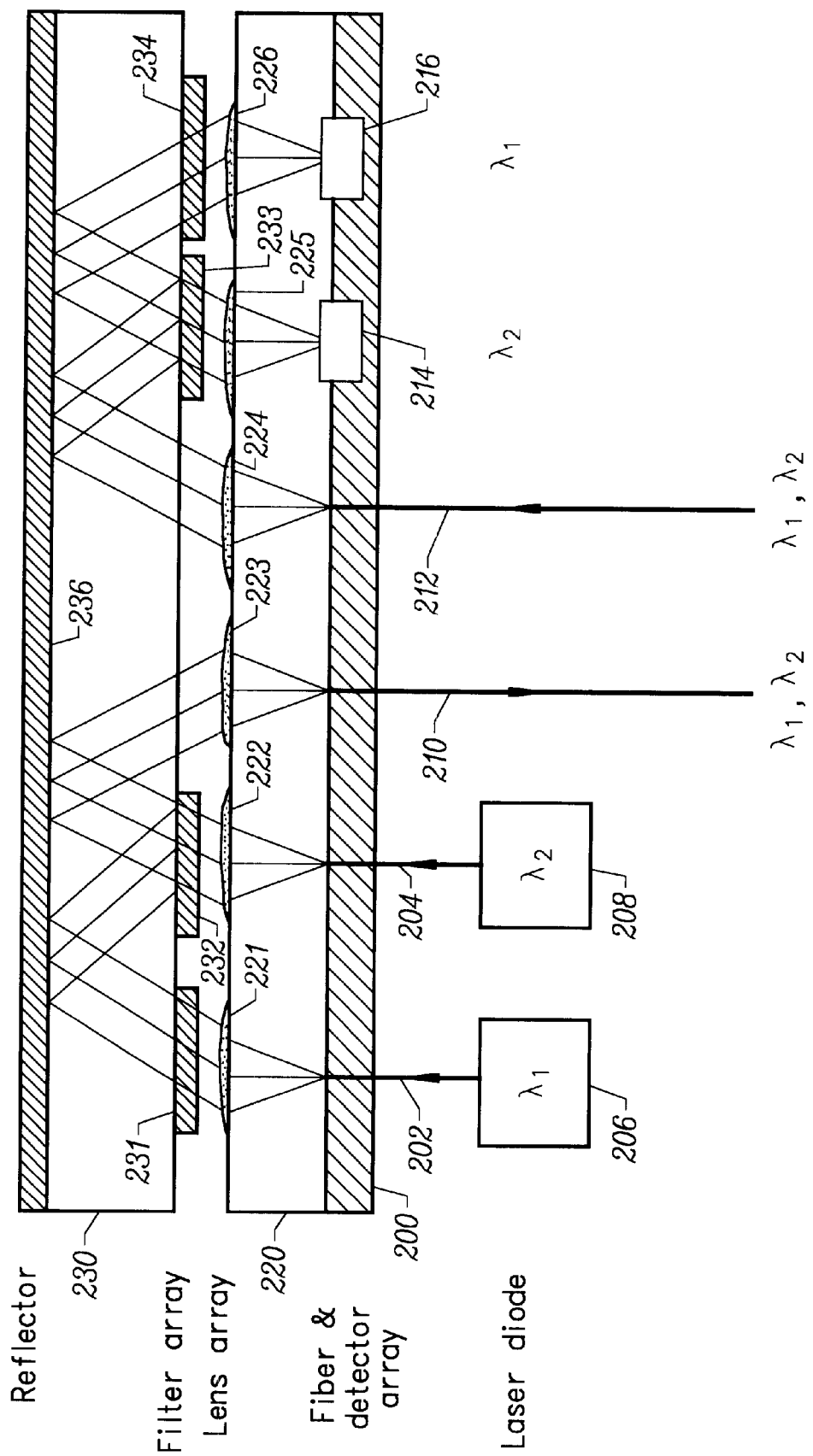
FIG. 13 shows the combination of a two channel multiplexer with a two channel demultiplexer.

FIG. 13 shows the combination of a two channel multiplexer with a two channel demultiplexer. Fiber/detector array 200 is operatively aligned to lens array 220, which is operatively aligned to filter array/reflector 230. Lens array 220 includes lenses 221–226. The filter array/reflector 230 includes filters 231–234 and reflector portion 236. The multiplexer portion of this embodiment includes fibers 202 and 204, each connected to a laser 206 and 208, respectively. The light from lasers 206 and 208 is combined in this device and collected in fiber 210. The demultiplexer portion of this device includes fiber 212 and detectors 214 and 216. Light from fiber 212 is demultiplexed in this embodiment and is detected by detectors 214 and 216.

Figure 14:
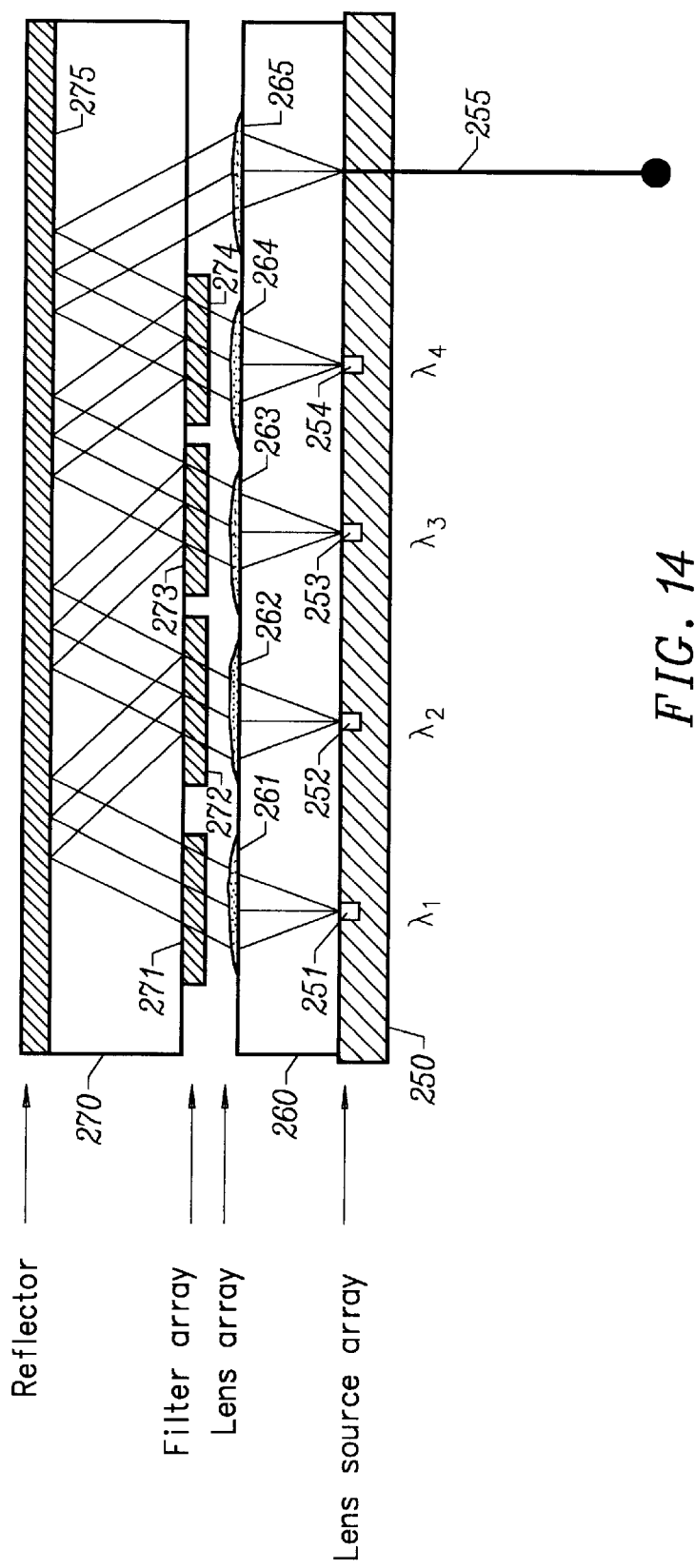
FIG. 14 shows a light source array that is aligned to a lens array.

Referring to FIG. 14, a light source array 250 is operatively aligned to lens array 260, which is operatively aligned to filter array/reflector 270. Light source array 250 includes light sources 251–254 and output fiber 255. Lens array 260 comprises lenses 261–265. Filter array/reflector 270 includes filters 271–274 and reflector portion 275. Light from the light sources 251–254 are collected by lens 265 and coupled into fiber 255. Light source array 250 along with fiber 255 are generically referred to as an input/output array.

Figure 15:
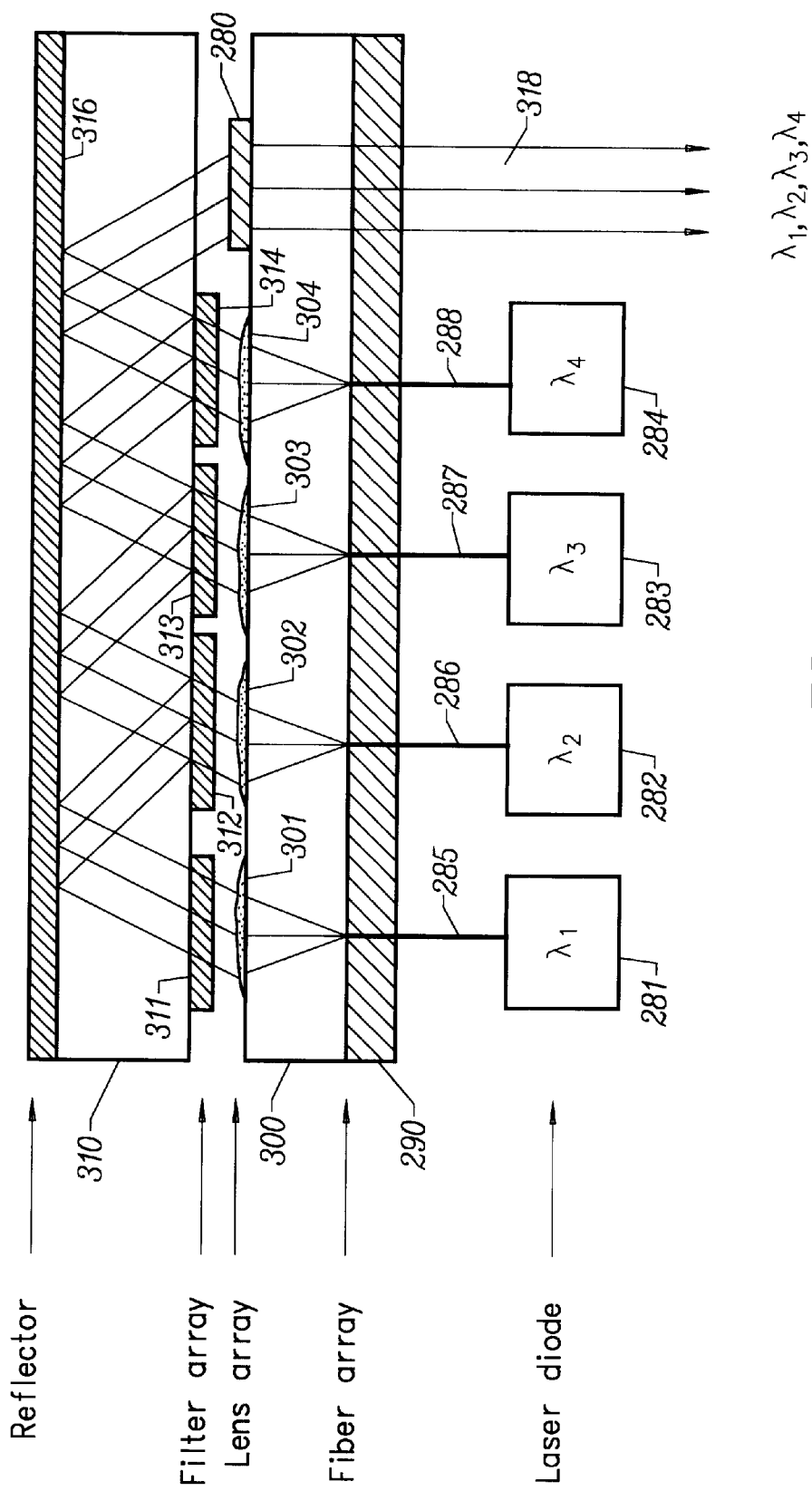
FIG. 15 shows and embodiment similar to that of FIGS. 1 and 4, except that light is collimated by a grating.

FIG. 15 shows and embodiment similar to that of FIGS. 1 and 4, except that light is collimated by a grating 280. The figure shows light sources 281–284 connected to fibers 285–288 respectively. The fibers are terminated in fiber array/grating 290, which is operatively aligned and connected to lens array 300, comprising lenses 301–304 and grating 280. Fiber array/grating 300 is operatively connected and aligned to filter array/reflector 310 which includes filters 311–314 and reflector portion 316. Light from light sources 281–284 are combined into a collimated beam 318.

Figure 16:
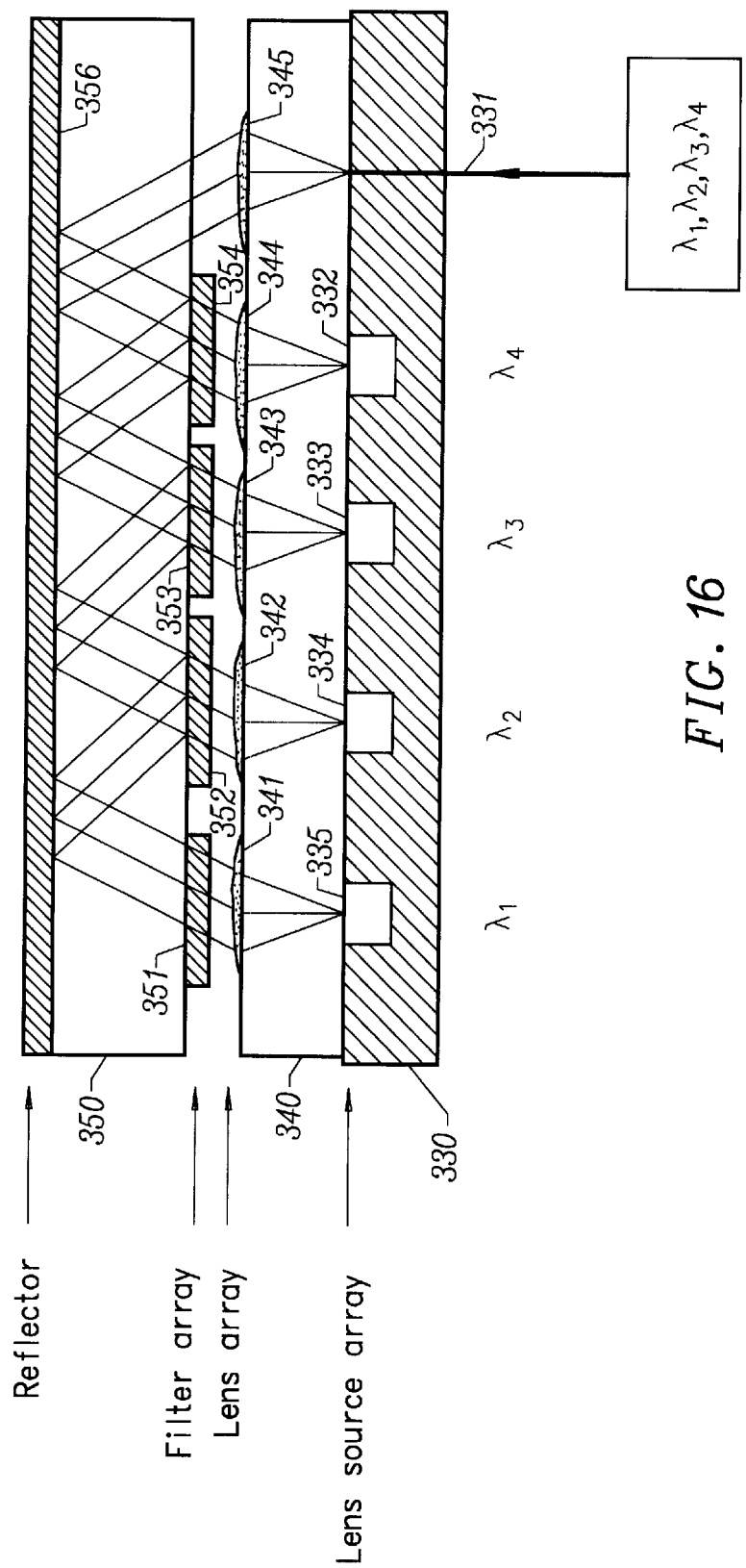
FIG. 16 shows a 4-channel demultiplexer including a detector array, a lens array and a filter array/reflector.

FIG. 16 shows a 4-channel demultiplexer including a detector array 330, a lens array 340 and a filter array/reflector 350. Detector array 330 includes an input fiber 331 and detectors 332–335. The lens array includes lenses 341–345. Fiber array/reflector 350 includes filters: 351–354 and reflector portion 356. Detector array 330 is operatively aligned and connected to lens array 340, which is operatively aligned and connected to filter array/reflector 350. In this embodiment, multi-wavelength light propagating from fiber 331 travels through the device and is demultiplexed to be detected by detectors 332–335. Detector array 330, along with input fiber 331, are generically referred to as an input/output array.

The embodiment of FIG. 17 is similar to that of FIG. 16, except that the lenses 341–344 of FIG. 16 are replaced with gratings. The detectors of FIG. 16 are not included in the embodiment of FIG. 17, which does include a substrate 370 having an input fiber 371 terminated therein. Substrate 370 with fiber 371 is operatively aligned and connected to grating array 380, which includes gratings 381–384 and lens 385. Grating array 380 is operatively aligned and connected to filter array/reflector 390, which includes filters 391–395 and reflector portion 396. In this embodiment, multi-wavelength light propagating from fiber 371 is demultiplexed into separate beams 400, 402, 404 and 408 where each beam comprises a different wavelength.

Certain design considerations may be selectively applied to the embodiments describes above. When all of the collimating lenses are made to be identical, as described above, the chromatic angular shift introduced by the collimating lens is cancelled. In the multiplexer, beams zigzagging at different angles in embodiments of the filter array/reflector described above will hit the focusing lens on a different location. This will result in cone-angle mismatch when the focused spot is coupled into the fiber. This effect may be compensated by designing the system so that the lens spacing is non-constant. It should be noted that the filters in the filter array/reflector may be monolithically made, or alternately may be either discrete filters or a conventional linear filter array. The substrate of the fiber array and the lens array may comprise silicon or other materials. The substrate of the filter array could also comprise materials other than silica.

In general, the devices shown as multiplexers may also be used as demultiplexers by reversing the direction of propagation through the system and removing the light sources used to inject light in the multiplexer mode. The number of channels are shown as illustrative, but should not be construed as limiting. The invention can be operated with any number of channels. In general, wherever an input fiber has been shown, this element may be replaced with a light source as shown in FIG. 14. Wherever a focusing lens is shown for coupling light into a fiber, it should be noted that such focusing lens can be replaced with a grating to provide collimation. In embodiments where system propagation is reversed to provide demultiplexing, a detector array may be provided.

The foregoing description of the invention has been presented for purposes of illustration and description and is not intended to be exhaustive or to limit the invention to the precise form disclosed. Many modifications and variations are possible in light of the above teaching. The embodiments were chosen and described to best explain the principles of the invention and its practical application to thereby enable others skilled in the art to best use the invention in various embodiments and with various modifications suited to the particular use contemplated. The scope of the invention is to be defined by the following claims.

We claim:

1. An apparatus, comprising:
    a first substrate comprising means for providing light to and/or receiving light from said apparatus;
    a second substrate comprising a plurality of diffractive input lenses, and an output diffractive lens, operatively connected thereto;
    wherein said input lenses are designed to be identical with respect to period and modulation depth and wherein said output lens comprises a period and modulation depth selected to be the opposite of the period and modulation depth of said input lenses, wherein chromatic angular shift will be substantially canceled by said output lens; and
    a third substrate comprising at least one filter operatively connected thereto, wherein said third substrate further comprises means for reflecting said light, wherein said first substrate and said second substrate and said third substrate are fixedly and operatively connected such that said apparatus operates to provide an optical wavelength multiplexer and/or demultiplexer.

2. An apparatus, comprising:

a first substrate comprising means for providing light to and/or receiving light from said apparatus;

a second substrate comprising a diffractive input lenses, and a plurality of diffractive output lenses, operatively connected thereto;

wherein said output lenses are designed to be identical with respect to period and modulation depth and wherein said output lenses comprise a period and modulation depth selected to be the opposite of the period and modulation depth of said input lens, wherein chromatic angular shift will be substantially canceled by said output lenses; and a third substrate comprising at least one filter operatively connected thereto, wherein said third substrate further comprises means for reflecting said light, wherein said first substrate and said second substrate and said third substrate are fixedly and operatively connected such that said apparatus operates to provide an optical wavelength multiplexer and/or demultiplexer.

3. An apparatus, comprising:

a first substrate comprising means for providing light to and/or receiving light from said apparatus;

a second substrate comprising a plurality of input lenses and an output lens operatively connected thereto;

wherein said means for providing light comprises a plurality of separate light sources, wherein each separate light source of said plurality of separate light sources comprises a wavelength that increases as the propagation distance of light produced by said separate light source increases to said output lens, wherein a focus shift due to longer wavelength is compensated by a focus shift caused by long propagation; and a third substrate comprising at least one filter operatively connected thereto, wherein said third substrate further comprises means for reflecting said light, wherein said first substrate and said second substrate and said third substrate are fixedly and operatively connected such that said apparatus operates to provide an optical wavelength multiplexer and/or demultiplexer.

4. An apparatus, comprising:

a first substrate comprising means for providing light to and/or receiving light from said apparatus;

a second substrate comprising a plurality of diffractive lenses operatively connected thereto;

wherein said diffractive lenses comprise high index material wherein modulation depth is low, resulting in higher diffraction efficiency and lower beam divergence angle, wherein substrate thickness tolerances and focal length error tolerances are increased, and a third substrate comprising at least one filter operatively connected thereto, wherein said third substrate further comprises means for reflecting said light, wherein said first substrate and said second substrate and said third substrate are fixedly and operatively connected such that said apparatus operates to provide an optical wavelength multiplexer and/or demultiplexer.

5. An apparatus, comprising:

a first substrate comprising means for providing light to and/or receiving light from said apparatus;

a second substrate comprising a plurality of diffractive lenses operatively connected thereto, wherein each lens of said plurality of lenses is non-uniformly spaced to compensate for cone-angle mismatch; and a third substrate comprising at least one filter operatively connected thereto, wherein said third substrate further comprises means for reflecting said light, wherein said first substrate and said second substrate and said third substrate are fixedly and operatively connected such that said apparatus operates to provide an optical wavelength multiplexer and/or demultiplexer.

6. An apparatus, comprising:

a first substrate comprising means for providing light to and/or receiving light from said apparatus, said means for providing light being selected from a group consisting of at least one fiber optic and at least one laser;

a second substrate comprising at least one lens operatively connected thereto; and a third substrate comprising at least one filter operatively connected thereto, wherein said third substrate further comprises means for reflecting said light, wherein said first substrate and said second substrate and said third substrate are fixedly and operatively connected such that said apparatus operates to provide an optical wavelength multiplexer and/or demultiplexer;

wherein said first substrate comprises surface A and surface B, wherein said light substantially diverges from said surface B, wherein said second substrate comprises surface C and surface D, wherein said surface B is operatively connected to said surface C, wherein said at least one lens is operatively connected to said surface D, wherein said third substrate comprises surfaces E and F, wherein said surface D is operatively connected to said surface E, wherein said at least one filter is operatively connected to said surface E, wherein said means for reflecting said light is operatively connected to said surface F, and wherein said surface F further comprises at least one lens.

7. An apparatus, comprising:

a first substrate comprising means for providing light to and/or receiving light from said apparatus, said means for providing light being selected from a group consisting of at least one fiber optic and at least one laser;

a second substrate comprising at least one lens operatively connected thereto; and a third substrate comprising at least one filter operatively connected thereto, wherein said third substrate further comprises means for reflecting said light, wherein said first substrate and said second substrate and said third substrate are fixedly and operatively connected such that said apparatus operates to provide an optical wavelength multiplexer and/or demultiplexer, wherein said first substrate comprises surface A and surface B, wherein said light substantially diverges from said surface B, wherein said second substrate comprises surface C and surface D, wherein said surface B is operatively connected to said surface C, wherein said at least one lens is operatively connected to said surface D, wherein said third substrate comprises surfaces E and F, wherein said surface D is operatively connected to said surface E, wherein a first bandpass filter of said at least one filter is operatively connected to said surface E and wherein a second bandpass filter of said at least one filter is operatively connected to surface F, wherein said at least one filter is selected to transmit a bandpass of wavelengths wherein said means for reflecting said light are embodied in said at least one filter, the apparatus further comprising:
a fourth substrate comprising a surface G and a surface H, wherein a second lens of said at least one lens is operatively connected to surface G, wherein said surface G is operatively connected to surface F;

a fifth substrate comprising a surface I and a surface J, wherein said surface I is operatively connected to surface H; and light input/output means operatively connected to said fifth substrate.

8. An apparatus, comprising:
a first substrate comprising means for providing light to and/or receiving light from said apparatus, said means for providing light being selected from a group consisting of at least one fiber optic and at least one laser;

a second substrate comprising at least one lens operatively connected thereto; and a third substrate comprising at least one filter operatively connected thereto, wherein said third substrate further comprises means for reflecting said light, wherein said first substrate and said second substrate and said third substrate are fixedly and operatively connected such that said apparatus operates to provide an optical wavelength multiplexer and/or demultiplexer, wherein said first substrate comprises surface A and surface B, wherein said light substantially diverges from said surface B, wherein said second substrate comprises surface C and surface D, wherein said surface B is operatively connected to said surface C, w here in said at least one lens is operatively connected to said surface D, wherein said third substrate comprises surfaces E and F, wherein said surface D is operatively connected to said surface E, wherein said at least one filter is operatively connected to said surface E, wherein said means for reflecting said light is operatively connected to said surface F, and at least one grating operatively connected to said surface D.

9. A wavelength division multiplexer/demultiplexer (WDM/DM), comprising:
an input/output array, comprising a first substrate and at least one fiber optic bonded to said first substrate, to produce an input/output array having a first side and a second side;

a lens array, comprising a second substrate having a lens mounting surface and a surface for placement adjacent said second side of said input/output array, said lens array including a plurality of first lenses and an input/output lens, wherein said plurality of first lenses and said input/output lens are adherent to said lens mounting surface, wherein said second substrate is operatively positioned with respect to said first substrate such that said input/output array is operatively aligned to said lens array, wherein said second side of said input/output array is bonded to said lens array at said surface for placement adjacent said second side of said input/output array; and a filter array/reflector combination comprising a third substrate with a filter side having at least one optical filter, said filter array/reflector combination further comprising a reflective coating opposite said filter side, wherein said third substrate is operatively positioned with respect to said second substrate such that said lens array is operatively aligned with said filter array/reflector, wherein said first substrate and said second substrate and said third substrate are fixedly and operatively connected to operate as either an optical wavelength multiplexer or an optical wavelength demultiplexer, wherein said at least one fiber optic comprises a plurality of input fiber optics and an output fiber optic, wherein said plurality of lenses is operatively positioned to substantially collimate light from said plurality of input fiber optics and refract said light at an angle, wherein said light will zigzag between said reflective coating and said filter side of said reflector/filter array, wherein said input/output lens will collect, focus and couple said light into said output fiber optic.

10. The WDM/DM of claim 9, wherein each fiber of said plurality of input fiber optics is connected to a separate light source.

11. The WDM/DM of claim 10, wherein each said separate light source comprises a fiber pig-tailed semiconductor laser.

12. The WDM/DM of claim 11, wherein said plurality of first lenses are designed to be identical with respect to period and modulation depth and wherein said input/output lens comprises a period and modulation depth that will substantially cancel chromatic angular shift generated from said first lenses.

13. The WDM/DM of claim 11, wherein said diffractive lenses comprise high index material, wherein modulation depth is low, resulting in higher diffraction efficiency and lower beam divergence angle, wherein substrate thickness tolerances and focal length error tolerances are increased.

14. The WDM/DM of claim 10, wherein each said separate light source comprises a wavelength that increases as the propagation distance of light produced by said separate light source increases to said input/output lens, wherein a focus shift due to longer wavelength is compensated by a focus shift caused by long propagation.

15. The WDM/DM of claim 9, wherein said angle is minimized by decreasing the index of refraction of said third substrate to increase the efficiency of said first lenses.

16. The WDM/DM of claim 9, wherein said angle is minimized by increasing the thickness of said third substrate to increase the efficiency of said first lenses.

17. A wavelength division multiplexer/demultiplexer (WDM/DM), comprising:
an input/output array, comprising a first substrate and at least one fiber optic bonded to said first substrate, to produce an input/output array having a first side and a second side;

a lens array, comprising a second substrate having a lens mounting surface and a surface for placement adjacent said second side of said input/output array, said lens array including a plurality of first lenses and an input/output lens, wherein said plurality of first lenses and said input/output lens are adherent to said lens mounting surface, wherein said second substrate is operatively positioned with respect to said first substrate such that said input/output array is operatively aligned to said lens array, wherein said second side of said fiber array is bonded to said lens array at said surface for placement adjacent said second side of said input/output array; and a filter array/reflector combination comprising a third substrate with a filter side having at least one optical filter, said filter array/reflector combination further comprising a reflective coating opposite said filter side, wherein said third substrate is operatively positioned with respect to said second substrate such that said lens array is operatively aligned with said filter array/ reflector, wherein said first substrate and said second substrate and said third substrate are fixedly and operatively connected to operate as either an optical wavelength multiplexer or an optical wavelength demultiplexer, wherein said at least one fiber optic comprises an input fiber optic and a plurality of output fiber optics, wherein said input/output lens is operatively positioned to substantially collimate light from said input fiber optic and to refract said light at an angle, wherein said light will zigzag between said reflective coating and said filter side of said reflector/filter array, wherein said plurality of first lenses will collect, focus and couple said light into said output fiber optics.

18. A wavelength division multiplexer/demultiplexer (WDM/DM), comprising:

an input/output array, comprising a first substrate and at least one fiber optic bonded to said first substrate, to produce an input/output array having a first side and a second side;

a lens array, comprising a second substrate having a lens mounting surface and a surface for placement adjacent said second side of said input/output array, said lens array including a plurality of first lenses and an input/output lens, wherein said plurality of first lenses and said input/output lens are adherent to said lens mounting surface, wherein said second substrate is operatively positioned with respect to said first substrate such that said input/output array is operatively aligned to said lens array, wherein said second side of said fiber array is bonded to said lens array at said surface for placement adjacent said second side of said input/output array; and a filter array/reflector combination comprising a third substrate with a filter side having at least one optical filter, said filter array/reflector combination further comprising a reflective coating opposite said filter side, wherein said third substrate is operatively positioned with respect to said second substrate such that said lens array is operatively aligned with said filter array/reflector, wherein said first substrate and said second substrate and said third substrate are fixedly and operatively connected to operate as either an optical wavelength multiplexer or an optical wavelength demultiplexer, wherein said input/output array comprises a plurality of laser diodes, wherein said at least one fiber optic comprises an output fiber optic, wherein said plurality of first lenses is operatively positioned to substantially collimate light from said plurality of laser diodes and refract said light at an angle, wherein said light will zigzag between said reflective coating and said filter side of said reflector/filter array, wherein said input/output lens will collect, focus and couple said light into said output fiber optic.

19. A wavelength division multiplexer/demultiplexer (WDM/DM), comprising:

an input/output array, comprising a first substrate and at least one fiber optic bonded to said first substrate, to produce an input/output array having a first side and a second side;

a lens array, comprising a second substrate having a lens mounting surface and a surface for placement adjacent said second side of said input/output array, said lens array including a plurality of first lenses and an input/output lens, wherein said plurality of first lenses and said input/output lens are adherent to said lens mounting surface, wherein said second substrate is operatively positioned with respect to said first substrate such that said input/output array is operatively aligned to said lens array, wherein said second side of said fiber array is bonded to said lens array at said surface for placement adjacent said second side of said input/output array; and a filter array/reflector combination comprising a third substrate with a filter side having at least one optical filter, said filter array/reflector combination further comprising a reflective coating opposite said filter side, wherein said third substrate is operatively positioned with respect to said second substrate such that said lens array is operatively aligned with said filter array/reflector, wherein said first substrate and said second substrate and said third substrate are fixedly and operatively connected to operate as either an optical wavelength multiplexer or an optical wavelength demultiplexer, wherein said at least one fiber optic comprises an input fiber optic, wherein said input/output array comprises a plurality of detectors, wherein said input/output lens is operatively positioned to substantially collimate light from said input fiber optic and to refract said light at an angle, wherein said light will zigzag between said reflective coating and said filter side of said reflector/filter array, wherein said plurality of first lenses will collect, focus and couple said light into said plurality of detectors.

20. A wavelength division multiplexer/demultiplexer (WDM/DM), comprising:

an input/output array, comprising a first substrate and at least one fiber optic bonded to said first substrate, to produce an input/output array having a first side and a second side;

a lens array, comprising a second substrate having a lens mounting surface and a surface for placement adjacent said second side of said input/output array, said lens array including a plurality of first lenses and an input/output lens, wherein said plurality of first lenses and said input/output lens are adherent to said lens mounting surface, wherein said second substrate is operatively positioned with respect to said first substrate such that said input/output array is operatively aligned to said lens array, wherein said second side of said fiber array is bonded to said lens array at said surface for placement adjacent said second side of said input/output array; and a filter array/reflector combination comprising a third substrate with a filter side having at least one optical filter, said filter array/reflector combination further comprising a reflective coating opposite said filter side, wherein said third substrate is operatively positioned with respect to said second substrate such that said lens array is operatively aligned with said filter array/reflector, wherein said first substrate and said second substrate and said third substrate are fixedly and operatively connected to operate as either an optical wavelength multiplexer or an optical wavelength demultiplexer, wherein said input/output lens comprises an optical axis and an entrance pupil, wherein displacement of said light from said optical axis is defined as beam shift, wherein the thickness of said filter array/reflector is chosen to minimize said beam shift.

* * * * *

UNITED STATES PATENT AND TRADEMARK OFFICE
CERTIFICATE OF CORRECTION

PATENT NO. : 6,563,976 B1
DATED : May 13, 2003
INVENTOR(S) : Eric B. Grann and Yung-Chieh Hsieh It is certified that error appears in the above-identified patent and that said Letters Patent is hereby corrected as shown below:

<u>Column 4,</u>
Line 8, the word "ate" should be -- are --
Line 16, after "the" insert the following -- present invention. Although this embodiment couples four lasers 10, 12, 14 and 16 --

Signed and Sealed this

Twenty-fifth Day of November, 2003

JAMES E. ROGAN
*Director of the United States Patent and Trademark Office*